US005359591A

United States Patent [19]
Nomoto

[11] Patent Number: 5,359,591
[45] Date of Patent: Oct. 25, 1994

[54] OPTICAL DISC HAVING INFORMATION PITS IN FORM OF PLURALITY OF FRAGMENTS ARRANGED IN SYMMETRICAL PATTERN

[75] Inventor: Takayuki Nomoto, Tokorozawa, Japan

[73] Assignee: Pioneer Electronic Corporation, Tokyo, Japan

[21] Appl. No.: 998,056

[22] Filed: Dec. 29, 1992

[30] Foreign Application Priority Data

Jan. 20, 1992 [JP] Japan .................................. 4-007840

[51] Int. Cl.$^5$ ................................................ G11B 7/26
[52] U.S. Cl. ............................ 369/275.4; 369/275.1; 369/275.3
[58] Field of Search ............... 369/275.4, 275.3, 275.1

[56] References Cited

U.S. PATENT DOCUMENTS

| | | | |
|---|---|---|---|
| 4,896,313 | 1/1990 | Hirose et al. | 369/275.4 |
| 4,956,214 | 9/1990 | Imataki et al. | 369/275.1 |
| 5,200,941 | 4/1993 | Matoba et al. | 369/275.3 |

FOREIGN PATENT DOCUMENTS

| | | |
|---|---|---|
| 0376626 | 7/1990 | European Pat. Off. . |
| 0502582 | 9/1992 | European Pat. Off. . |

*Primary Examiner*—Paul M. Dzierzynski
*Assistant Examiner*—Kim-Kwok Chu
*Attorney, Agent, or Firm*—Sughrue, Mion, Zinn Macpeak & Seas

[57] ABSTRACT

An optical disc has an information recording surface on which information is recorded, the information being read out and reproduced by irradiating a laser light having predetermined wavelength under the condition of a predetermined numerical aperture and receiving a diffracted and reflected laser light. The disc includes a track spirally formed on the information recording surface and extending in a disc peripheral direction, a plurality of information units formed on the track each having predetermined unit lengths in both of the disc peripheral direction and a disc radial direction. The information is recorded in the form of an information pit in each of the information units. The information pits have a plurality of pit patterns each of which is formed as combination of four pit fragments having the substantially same shape. Each of the pit fragment has a predetermined optical pit height and a plane figure which is symmetrical with respect to one of a first line or a second line, the first line passing through center points of each of the information units and extending in the disc peripheral direction, the second line passing through the center point and extending in the disc radial direction.

10 Claims, 22 Drawing Sheets

F I G. 13
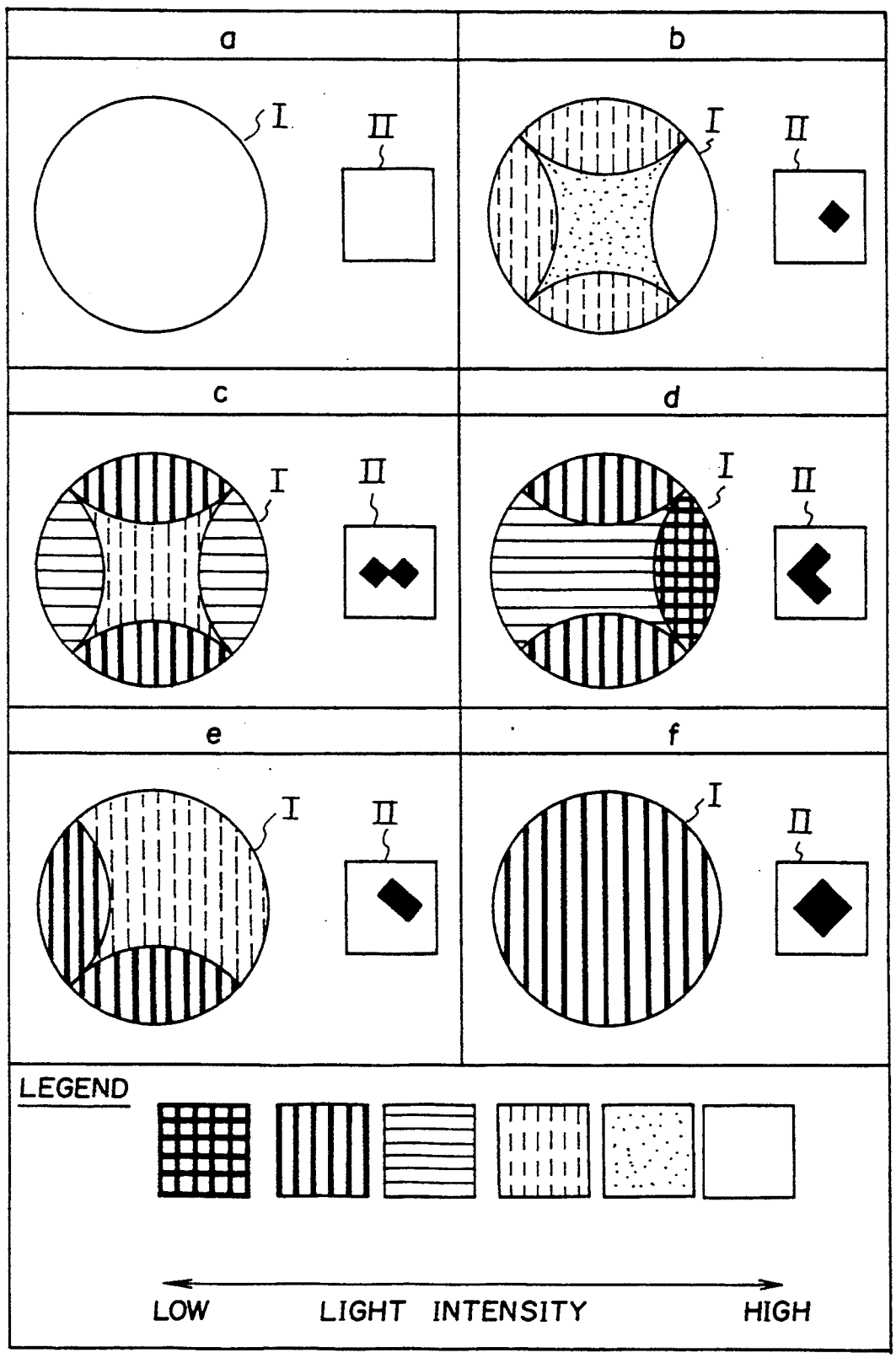

| | $S_0$ | $S_1$ | $S_2$ | $S_3$ | $S_4$ | $S_5$ | $S_6$ | $S_7$ | $S_8$ | $S_9$ | HEXADECIMAL CODE |
|---|---|---|---|---|---|---|---|---|---|---|---|
| $G_1$ | 100 | 0 | | 0 | | 0 | | 0 | | | 0 |
| | 77.3 | 6.10 | | 0 | | -6.10 | | 0 | | | 1 |
| | 77.3 | 0 | | 6.10 | | 0 | | -6.10 | | | 2 |
| | 77.3 | -6.10 | | 0 | | 6.10 | | 0 | | | 4 |
| | 77.3 | 0 | | -6.10 | | 0 | | 6.10 | | | 8 |
| $G_2$ | 61.8 | | 6.08 | | 0 | | -6.08 | | 0 | 0 | 3 |
| | 61.8 | | 0 | | 6.08 | | 0 | | -6.08 | 0 | 6 |
| | 61.8 | | -6.08 | | 0 | | 6.08 | | 0 | 0 | C |
| | 61.8 | | 0 | | -6.08 | | 0 | | 6.08 | 0 | 9 |
| | 61.8 | | 0 | | 0 | | 0 | | 0 | 2.06 | 5 |
| | 61.8 | | 0 | | 0 | | 0 | | 0 | -2.06 | A |
| $G_3$ | 53.2 | -6.08 | | 0 | | 6.08 | | 0 | | | E |
| | 53.2 | 0 | | -6.08 | | 0 | | 6.08 | | | D |
| | 53.2 | 6.08 | | 0 | | 6.08 | | 0 | | | B |
| | 53.2 | 0 | | 6.08 | | 0 | | -6.08 | | | 7 |
| | 53.2 | 0 | | 0 | | 0 | | 0 | | | F |

OPTICAL DISC HAVING INFORMATION PITS IN FORM OF PLURALITY OF FRAGMENTS ARRANGED IN SYMMETRICAL PATTERN

BACKGROUND OF THE INVENTION

1. Field of the Invention

This invention relates to an optical disc, an optical disc reproducing apparatus and recording and reproducing methods for an optical disc.

2. Description of Prior Art

There has been known an optical disc on which music information or picture information is recorded, and an optical disc reproducing apparatus for reproducing the recorded information from the optical disc. In such optical disc and optical disc reproducing apparatus, as shown in FIG. 1, the music information or picture information is recorded on an information recording surface 95 of the optical disc 92 in such a manner that information is converted to signals corresponding to an information pit 92 whose pit length serves as a parameter. In order to reproduce the information recorded on the optical disc 92 as pits, a laser beam is irradiated onto the information pit 91 in the form of a beam spot LS having a predetermined diameter, and a diffracted and reflected light from the information pit 91 is detected by a photodetector which includes a photodiode or the like to convert the detected light to an electrical signal. Music information or picture information recorded on the optical disc 92 is extracted from the electrical signal by a signal conversion processing converse to that of the recording operation, and output from the reproducing device. A compact disc (CD) and a laser video disc (LVD) are well known as the example of the optical disc 92 and the optical disc reproducing device as described above, respectively. In FIG. 1, a reference numeral 93 represents a substrate formed of polycarbonate resin or the like, and a reference numeral 94 represents a protection layer.

As seen from FIG. 2, the information recording density of the optical disc is greatly dependent on both of a track pitch P1 which is defined as an interval between the central lines of bit arrays on which information pits 91 are formed, and the diameter of the beam spot LS of the laser beam which is irradiated onto the information pits 91. In view of this, various attempts for making the track pitch of an optical disc narrower than the current track pitch are made so as to increase the amount of information recorded on the optical disc.

However, the following problem occurs in a case as shown in FIG. 3 where the track pitch is set to a value P2 which is smaller than a currently-adopted value P1 (for example, P2=P1/2). That is, as shown in FIG. 3, in addition to a target information pit 91A to be read out by a beam spot LS, neighboring information pits 91B and 91C locating at both sides of the track of the information pit 91A are unfavorably read out by the beam spot LS. Consequently, since a cross-talk amount is increased, such an optical disc having narrower track pitch can not be practically used.

On the other hand, another attempt to reduce the diameter of the beam spot LS of the laser light has been made. The beam diameter w when a laser beam having wavelength λ is focused to a position of focus distance f by an objective lens OL as shown in FIG. 4 is represented by the following equation.

$$w = 1.22 \times \lambda / NA \quad (1)$$

Here, NA represents the numerical aperture of the objective lens OL. When the refractive index of the lens is n and the angle of emergence of the laser light with respect to the lens is $\theta$, NA is represented by the following equation.

$$NA = N \times \sin\theta \quad (2)$$

Therefore, the laser beam diameter w can be reduced by shortening the wavelength λ of the laser light or increasing the numerical aperture NA. Regarding the wavelength λ of the laser light, the wavelength of a semiconductor laser which is presently used for an optical disc is about $\lambda = 0.780$ μm ($\mu m = 10^{-6}$ meter). Regarding the numerical aperture NA, NA is approximately 0.45 for a CD. Therefore, the minimum laser beam diameter $w_{min}$ is approximately equal to 2.1 μm by the following equation.

$$w_{min} = 1.22 \times 0.780 / 0.45 = 2.1 \text{ (μm)}$$

Accordingly, the minimum track pitch which provides no crosstalk when the laser beam spot is irradiated onto a bit array is about 1.6 μm, and this value is adopted in many optical discs which have been practically used at present.

SUMMARY OF THE INVENTION

It is an object of the present invention to provide an optical disc, an reproducing apparatus and method for recording and reproducing optical disc which can increase the amount of recording information under the condition of the beam spot diameter and the wavelength of the present laser beam.

According to one aspect of the present invention, there is provided an optical disc having an information recording surface on which information is recorded, the information being read out and reproduced by irradiating a laser light having predetermined wavelength under the condition of a predetermined numerical aperture and receiving a diffracted and reflected laser light, the disc including: a track spirally formed on the information recording surface and extending in a disc peripheral direction defined as a direction along the periphery of the optical disc, the track having a predetermined track pitch between neighboring tracks; a plurality of information units formed on the track, each of the information unit having predetermined unit lengths in both of the disc peripheral direction and a disc radial direction defined as a direction perpendicular to the disc peripheral direction; the information being recorded in the form of an information pit in each of the information units, the information pit having a plurality of pit patterns each of which is formed as combination of four pit fragments having the substantially same shape, each of the pit fragment having a predetermined optical pit height and a plane figure which is symmetrical with respect to one of a first line or a second line, the first line passing through center points of each of the information units and extending in the disc peripheral direction, the second line passing through the center point and extending in the disc radial direction, and a common point in the plane figures of the four pit fragments being located at the position substantially coincident with the center point of the information unit.

According to another aspect of the present invention, there is provided an optical disc reproducing apparatus for reproducing information from the optical disc, including: light irradiation device for irradiating a laser light having predetermined wavelength onto the information recording surface of the optical disc under the condition of the predetermined numerical aperture; photodetecting device having a detecting surface divided into eight photodetecting sectors for converting laser light incident to each of the photodetecting sectors to electrical signals and outputting the electrical signals as a photodetection signals, one of separating lines of the photodetecting sectors being parallel to the disc peripheral direction; an optical system having an optical path through which a returned laser light diffracted and reflected from the information pit is incident to the center portion of the photodetecting device when the laser light is irradiated onto the center line of the track; calculating device for calculating and outputting calculation signals indicating presence of the pit fragments on the basis of the photodetection signals from each of the photodetecting sectors; and information reproducing device for reproducing the recorded information by specifying one of the plurality of the pit patterns in accordance with each of the calculation signals.

According to still another aspect of the present invention, there is provided a method for recording information onto an optical disc having an information recording surface to be recorded with information which is read out and reproduced by irradiating a laser light having predetermined wavelength under the condition of a predetermined numerical aperture and receiving a diffracted and reflected laser light, the method including the steps of: providing a plurality of information units on the information recording surface in a spiral track sequence so as to extend in a disc peripheral direction defined as a direction along the periphery of the optical disc and have a predetermined track pitch between two neighboring tracks, each of the information units having predetermined unit lengths in both of the disc peripheral direction and a disc radial direction defined as a direction perpendicular to the disc peripheral direction, assigning information to be recorded to one of a plurality of pit patterns, each of the pit patterns being formed as a combination of four pit fragments having substantially same shape, each of the pit fragment having a predetermined optical pit height and a plane figure which is symmetrical with respect to one of a first line and a second line, the first line passing through a center point of the information unit and extending in the disc peripheral direction, the second line passing through the center point of the information unit and extending in the disc radial direction, recording information in each of the plurality of information units by forming information pits having the pit patterns in such a manner that a common point of the plane figures of the four pit fragments is located at the position substantially coincident with the center point of the information unit.

According to still another aspect of the present invention, there is provided a method for reproducing information from the optical disc, including the steps of: irradiating a laser light having predetermined wavelength onto the information recording surface of the optical disc under the condition of the predetermined numerical aperture; receiving a returned laser light diffracted and reflected from the information pit by photodetecting device having a detecting surface divided into eight photodetecting sectors, one of separating lines for the photodetecting surface being parallel to the disc peripheral direction; converting the returned laser light incident to each of the photodetecting sectors to electrical signals and outputting the electrical signals as a photodetection signal; calculating and outputting calculation signals indicating presence of the pit fragments on the basis of the photodetection signals; and specifying one of the plurality of pit patterns in accordance with each of the calculation signals and reproducing the recorded information.

In a case where the recorded information is reproduced from the optical disc, the laser light having predetermined wavelength is irradiated onto the information recording surface of the optical disc under the condition of the predetermined numerical aperture, and an optical pass is so designed that when the laser light is irradiated onto the center line of the track, a returned laser light diffracted and reflected from the information pit is incident to the center portion of the photodetecting surface of photodetecting device having a photodetecting surface divided into eight photodetecting sectors, one of separating lines for the photodetecting surface being a line parallel to the disc peripheral direction, and serving to convert light incident to the photodetecting surface to an electrical signal and output the electrical signal as a photodetection signal. Thereafter, calculation signals are calculated and output on the basis of the photodetection signals from each of the photodetecting sectors of the photodetecting surface, the pit pattern is specified in accordance with the calculation signals, and the recorded information is reproduced through an information converting operation which is converse to the information converting operation used for formation of the information pit.

BRIEF DESCRIPTION OF THE DRAWINGS

FIG. 13 is a diagram showing a light intensity distribution pattern which represents a calculation result of this invention;

DETAILED DESCRIPTION OF THE PREFERRED EMBODIMENTS

Figure 1:
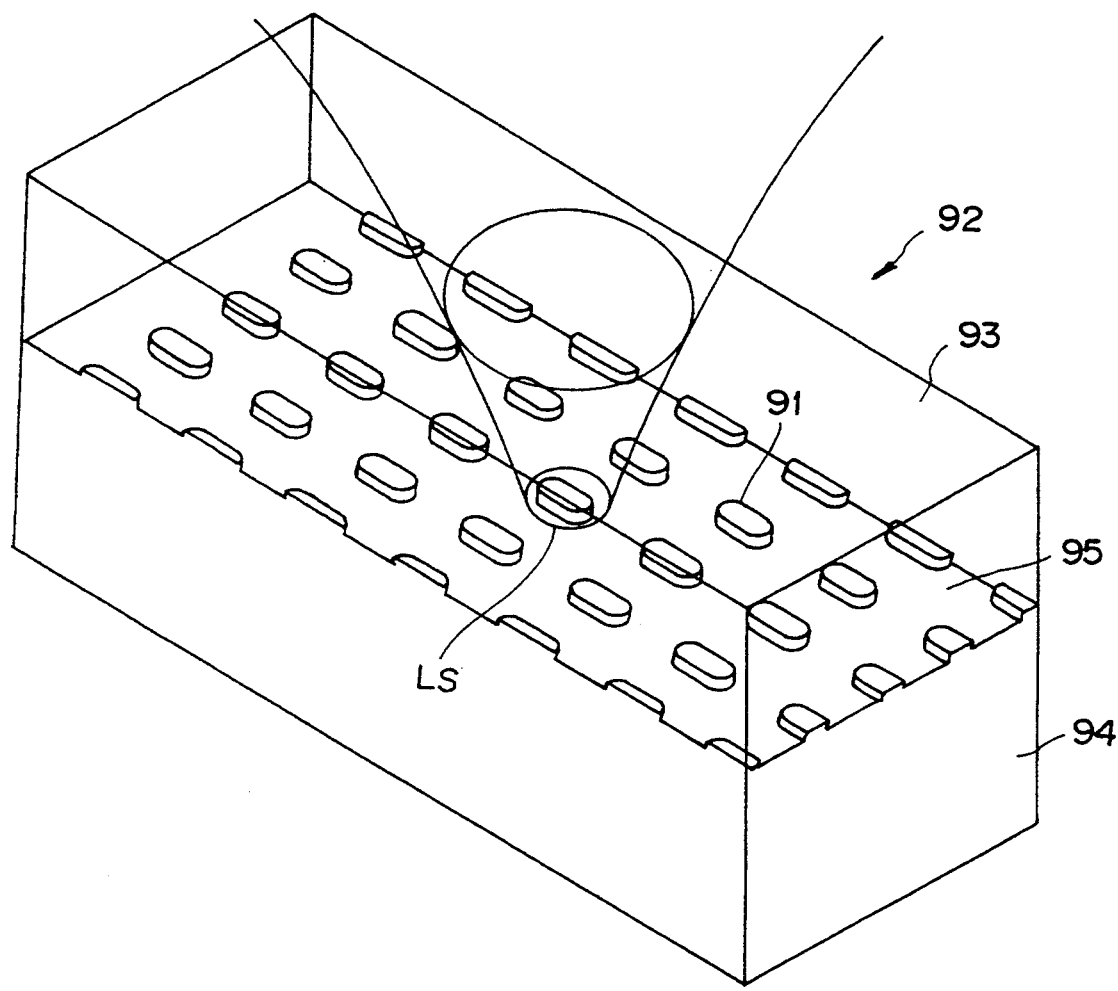
FIG. 1 shows the construction of an optical disc.
Figure 2:
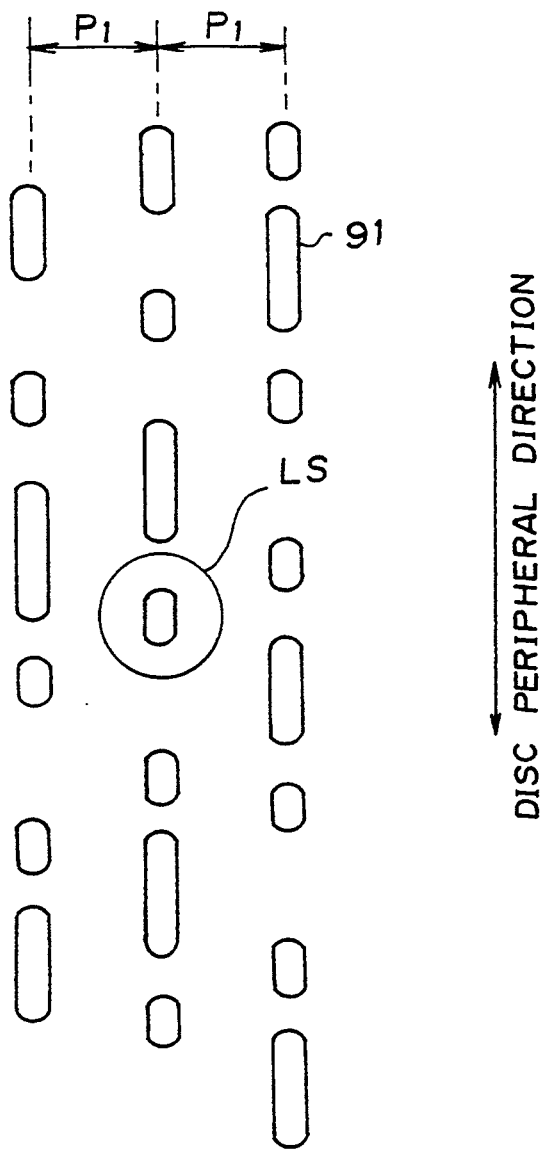
FIG. 2 is a diagram showing a track pitch of the optical disc shown in FIG. 1.
Figure 3:
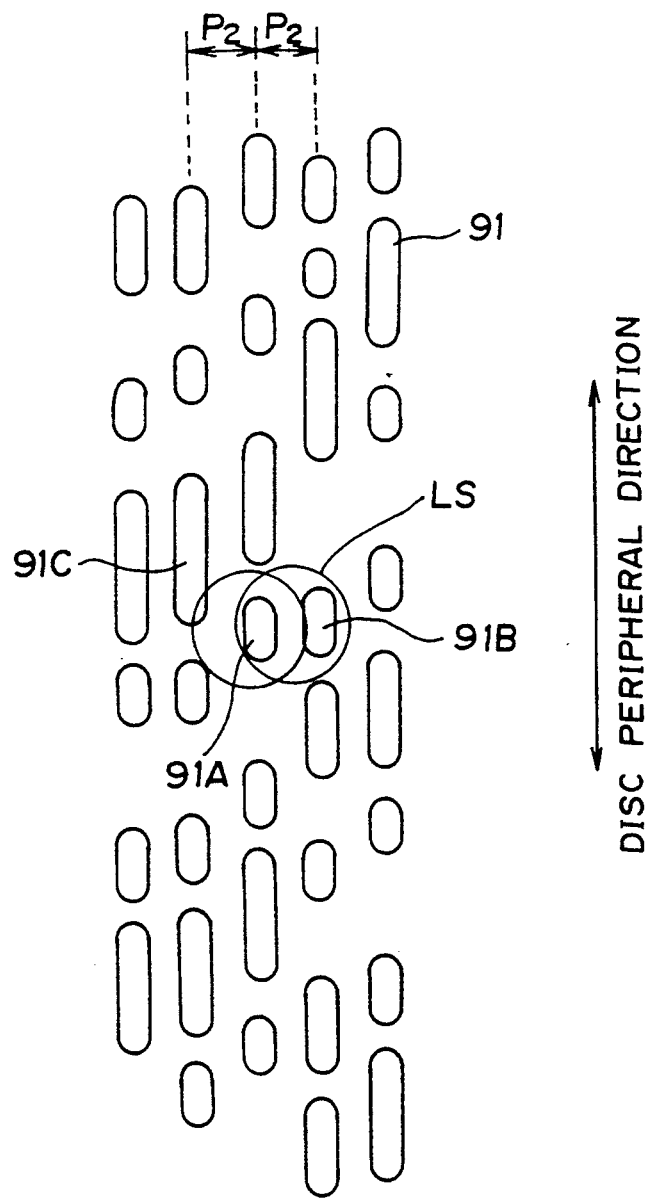
FIG. 3 is a diagram of an optical disc whose track pitch is set to a half of the track pitch of the optical disc shown in FIG. 2.
Figure 4:
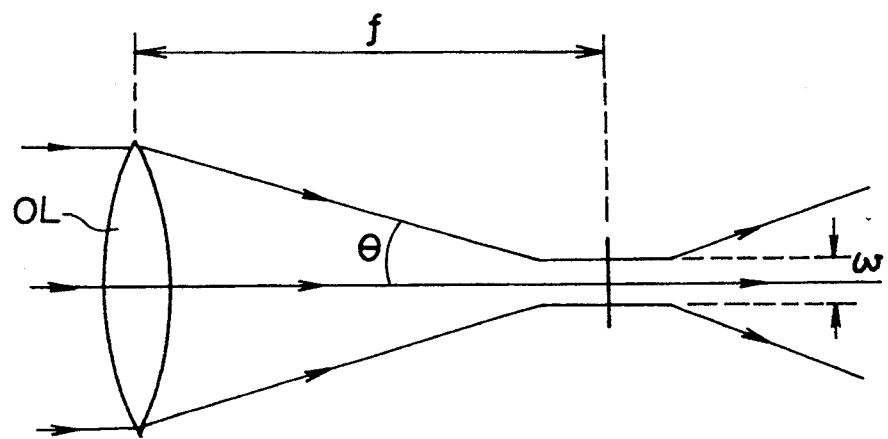
FIG. 4 is a diagram showing the relationship between an objective lens and a laser spot for the optical disc shown in FIG. 2.

Preferred embodiments of the present invention will be described with reference to the accompanying drawings.

First Embodiment

FIGS. 5 to 8 show the construction of the first embodiment in which this invention is applied to a compact disc. FIG. 5(A) shows the external appearance of the compact disc 2 of this embodiment. As shown in FIG. 5(A), the compact disc 2 is provided with a track T which is wholly spirally formed on the compact disc 2 to extend from the inner peripheral side of the compact disc 2 to the outer peripheral side thereof (hereinafter referred to as "a track sequence T"). FIG. 5(B) is an enlarged view of a portion M of the compact disc 2, where a reference numeral 1 represents an information pit.

Figure 5A:
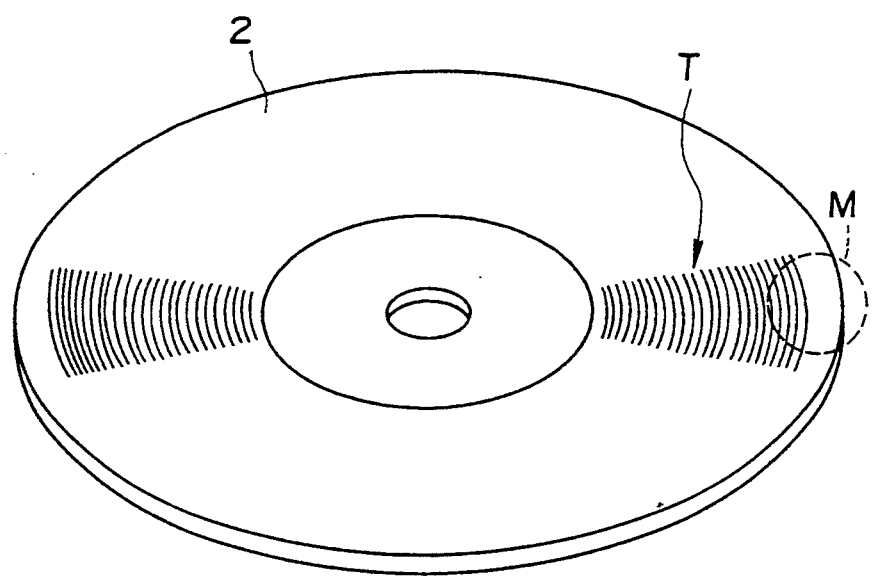
FIGS. 5(A) and 5(B) show an optical disc according to the first embodiment of this invention.
Figure 5B:
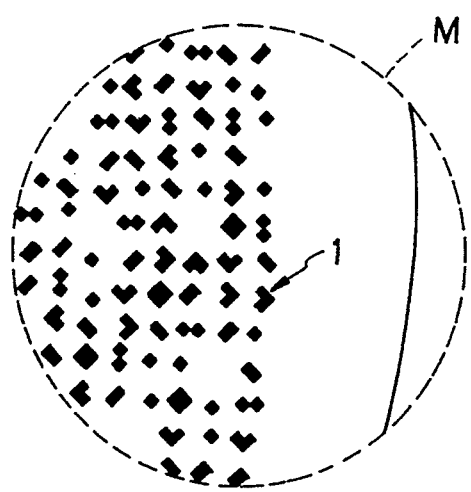
Figure 6:
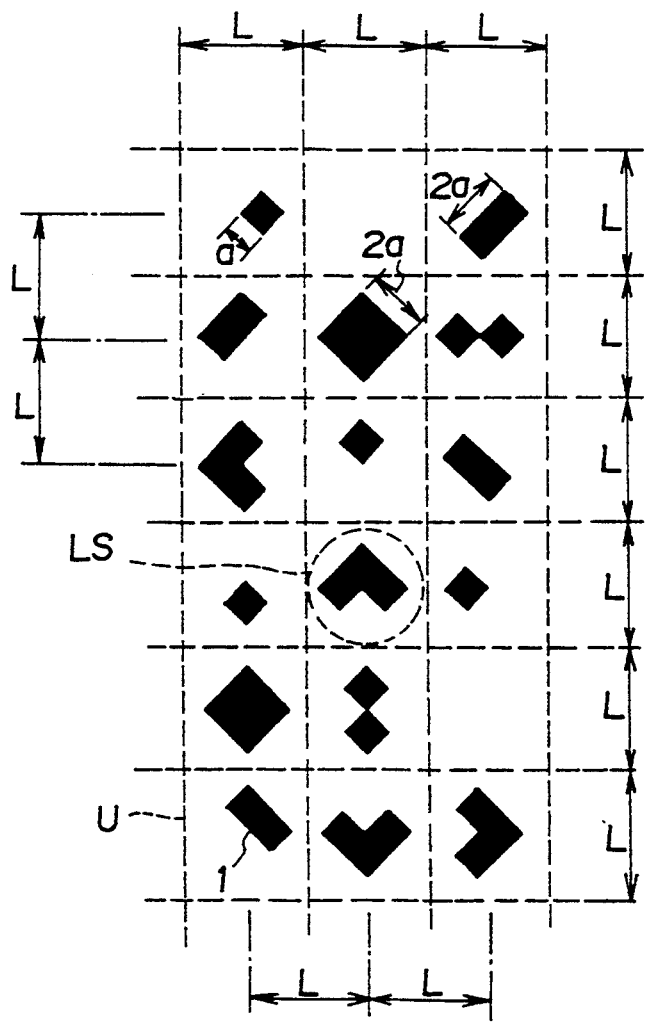
FIG. 6 is a diagram showing the construction of the first embodiment according to this invention.

FIG. 6 is a further enlarged view of the portion M of the compact disc 2 shown in FIG. 5(B). As shown in FIG. 6, the information pit 1 is formed within a square information unit U having four sides of unit length L in a disc peripheral direction and in a disc radial direction. And as shown in FIG. 5, each information unit U is provided so as to be adjacent to other information units in the disc peripheral direction and the disc radial direction. Therefore, a track pitch in this embodiment is set to L.

Figure 7A:
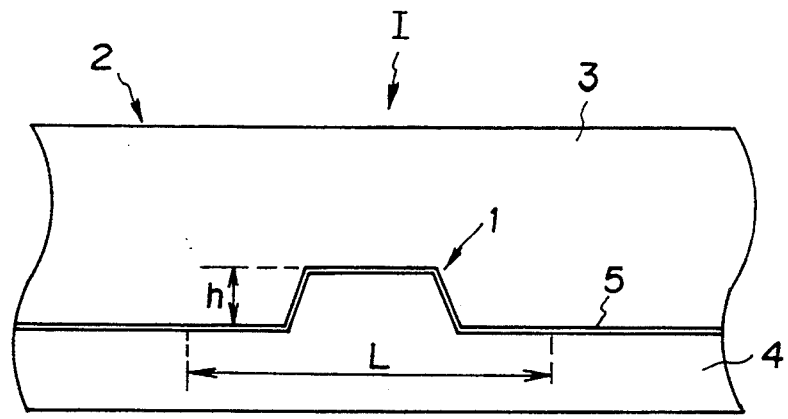
FIGS. 7(A)–7(C) are other diagrams showing the construction of the first embodiment according to this invention.
Figure 7B:
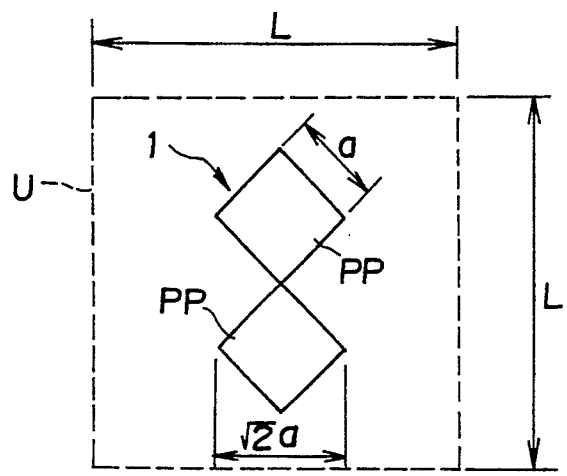

FIG. 7(A) is a cross-sectional view of the compact disc 2 shown in FIG. 5. As shown in FIG. 7(A), the compact disc 2 includes a protection layer 4, an information recording surface 5 obtained by forming pits on one surface of the protection layer 4 so as to be upwardly projected from the surface and covering the pit portions and flat surface portions other than the pit portions with a metal deposition film of metal or the like, and a transparent substrate 3 formed of polycarbonate resin or the like which has refractive index of n and is coated on the information recording surface 5.

Figure 8:
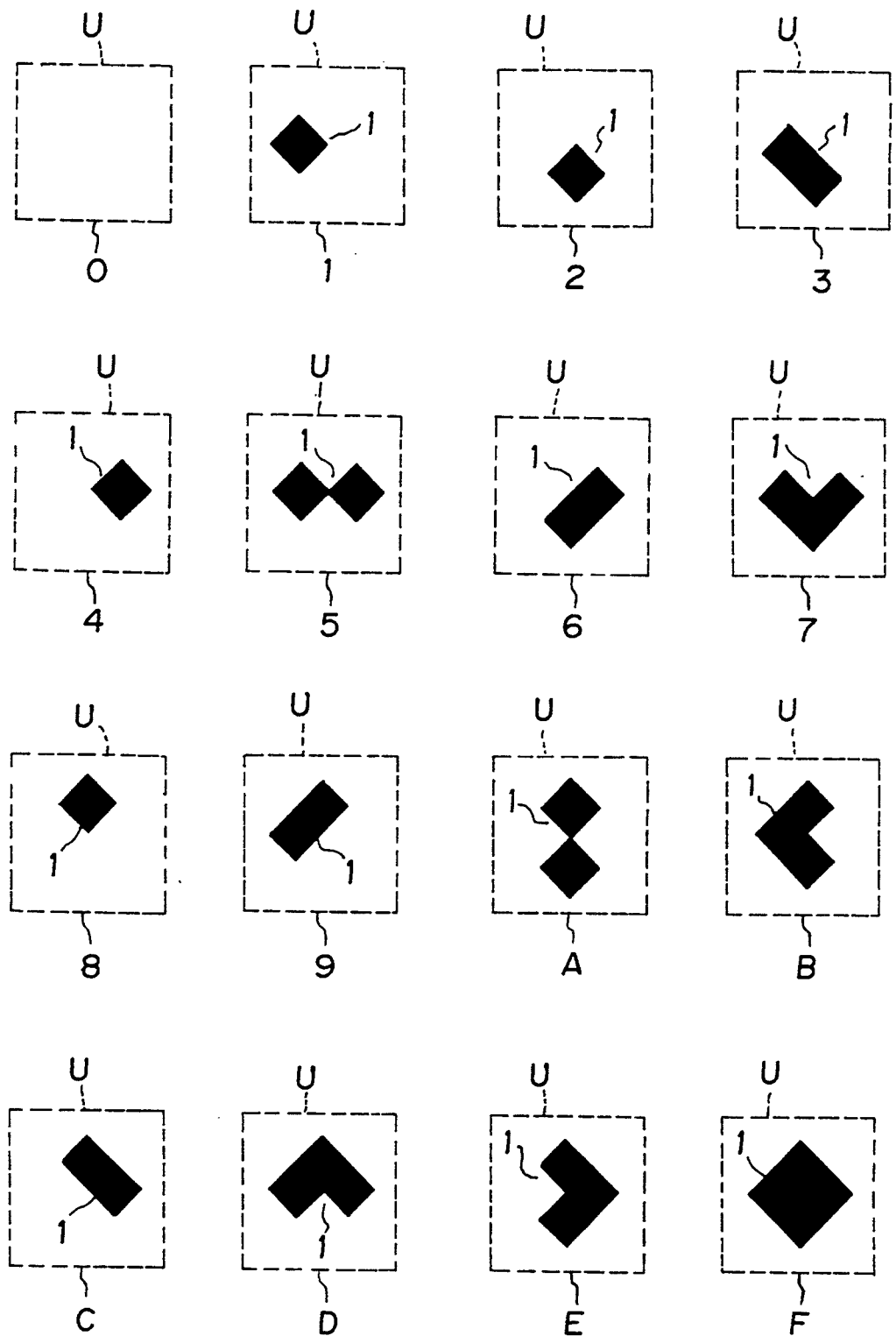
FIG. 8 shows a bit pattern of the first embodiment according to this invention.

That is, an information pit is an projection formed of the metal deposition film. As shown in the cross-sectional and plan views of FIGS. 7(A) and 7(B) respectively, the information pit 1 is formed as a combination of four pit fragments PP each of which has a rhombic shape at the upper surface thereof, one side of the rhombic shape having the length a, and has the height h from the flat surface portion to the upper surface of the pit fragment. Sixteen patterns of information pits as shown in FIG. 8 can be formed by suitably combining the four pit fragments PP, including a case of using no pit fragment (O) to a case of using all pit fragments (F). Each of the 16 information pits corresponds to a hexadecimal digit. That is, from the equation $16 = 2^4$, information having 4-bit information amount can be expressed by the information pits as shown in FIG. 8. The optical height of the information pit 1 is equal to $n \times h$.

Figure 7C:
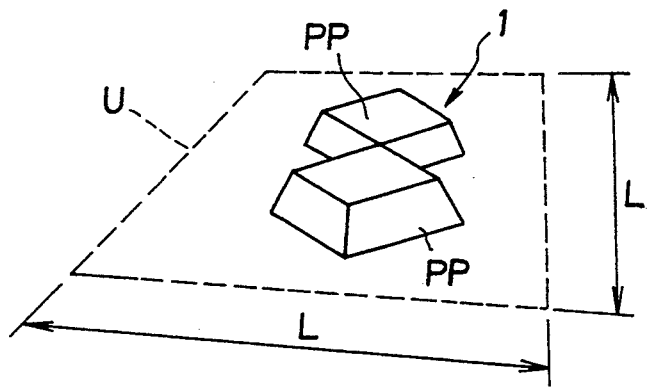

FIG. 7(C) is a perspective view of the information pit which is slantly viewed from the upper side. As shown in FIG. 7(C), the information pit 1 has a projective shape upon slantly viewing from the upper side. When the pit information is read out, the laser beam is irradiated from a direction I as shown in FIG. 7(A). That is, in this embodiment, the information pit 1 is designed to project to the direction of irradiated laser beam.

Second Embodiment

A second embodiment in which this invention is applied to a compact disc player will be next described.

Figure 9:
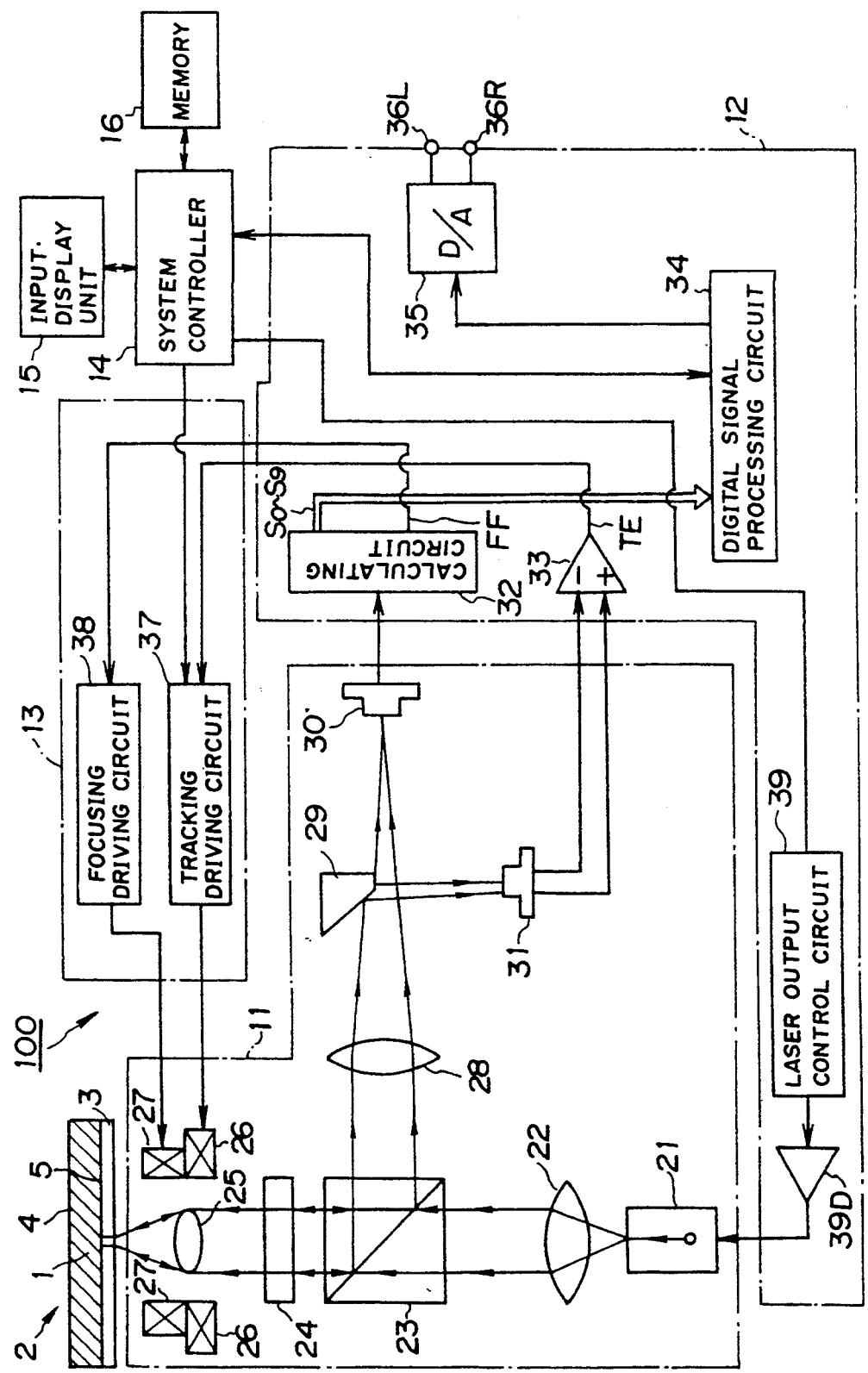
FIG. 9 shows the construction of an optical disc reproducing apparatus according to the second embodiment.

As shown in FIG. 9, a compact disc player 100 of this embodiment roughly includes an optical pick-up 11 for reading out information from the compact disc (CD) 2, a signal processing unit 12 for processing a read-out information signal, a pick-up control unit 13 for controlling the optical pick-up 11, a system controller 14 for overall controlling the compact disc player 100, an input.display unit 15 and a memory unit 16.

The optical pick-up 11 includes a semiconductor laser 21 for generating and emitting a laser beam, a collimator lens 22 for collimating the emitted laser beam, a beam splitter 23 for passing the collimated beam therethrough, a quarter wavelength plate 24 for providing the collimated laser beam passed through the beam splitter 23 with an optical pass difference of quarter wavelength, an objective lens 25 for focusing the laser beam passed through the quarter wavelength plate 24 onto an information recording surface 5 of the CD 2, a focusing lens 28 for focusing a reflection laser beam which is reflected from a reflection film 5 of the CD 2, passed through the objective lens 25 and the quarter wavelength plate 24 again and then reflected from the reflection surface of the beam splitter 23 in a direction perpendicular to the beam propagating direction, a prism mirror 29 for guiding the reflection laser beam passed through the focusing lens 28 to an photodetector 30 divided into eight photodetecting sectors, the photodetector 30 for detecting the reflection laser beam from the prism mirror 29, and a photodetector 31 which is divided into two photodetecting sectors and serves to detect the reflection laser beam which is split from the prism mirror 29. In this case, the laser beam is irradiated from the lower side of the CD 2 as shown in FIG.9.

The signal processing unit 12 includes a calculating circuit 32 for receiving the output signal from the photodetector 30 to conduct a predetermined calculation on the received signal and output the calculated result, a subtracter 33 for receiving the output signal of the photodetector 31 and output the difference output therebetween as a tracking error signal TE, a digital signal processing circuit 34 for receiving one of the output signals of the calculating circuit 32 and conducting a digital signal processing on the received signal to decode and output the information signal, a D/A converter 35 for modulating the digital output of the digital signal processing circuit 34 to an analog signal, output terminals 36L and 36R through which the output of the D/A converter 35 are output to the outside, a semiconductor laser driving circuit 39D for driving the semiconductor laser 21, and a laser output control circuit 39 for controlling the semiconductor laser driving circuit 39D.

The pick-up control unit 13 includes a tracking driving circuit 37 for receiving the tracking error signal TE output from the subtracter 33 to control a tracking actuator 26, and a focusing driving circuit 38 for controlling a focusing actuator 27 on the basis of a focus error signal FE which is the other output signal of the calculating circuit 32.

The system controller 14 serves to control the digital signal processing circuit 34, the tracking driving circuit 37 and the laser output control circuit 39 on the basis of an instruction input via the input.display unit 15 and delivered from and to the storing unit 16.

Figure 10:
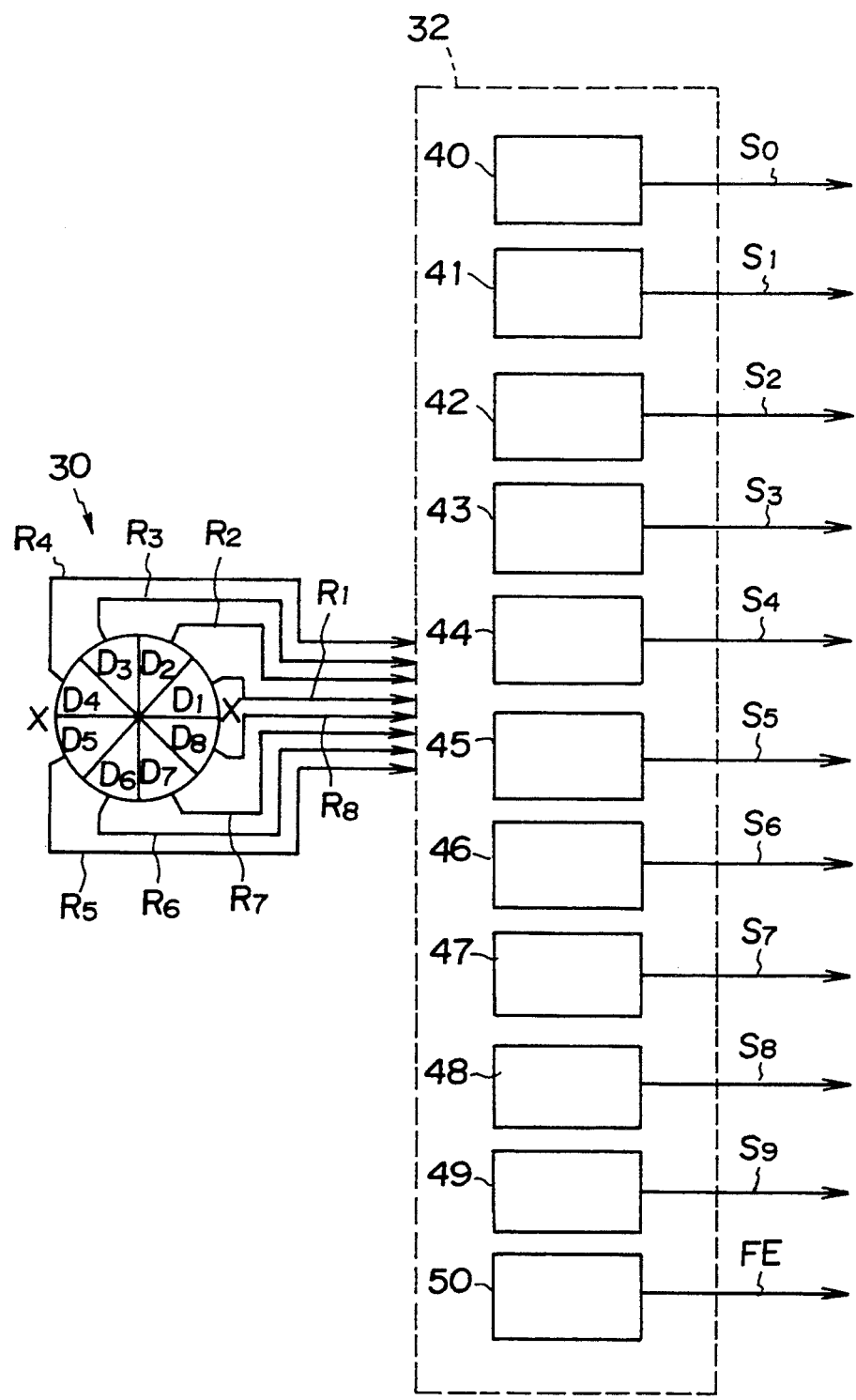
FIG. 10 shows the detailed construction of a photodetector and a calculating circuit in the second embodiment of this invention.

The detailed construction of the photodetector 30 and the calculating circuit 32 is shown in FIG. 10. As shown in FIG. 10, the photodetector 30 has eight photodetecting areas $D_1$ to $D_8$, and the calculating circuit 32 includes information signal calculating units 40 to 49 and a focus error signal calculating unit 50 which are designed in the connection arrangement as shown in FIG. 10. In this case, information signals $S_0$ to $S_9$ are output from the information signal calculating units 40 to 49, and the focus error signal FE is output from the focus error calculating unit 50. In this embodiment, the direction of a separating line X—X of the photodetector 30 is set to be parallel to the disc peripheral direction and the optical system is so constructed that when a laser spot passed through the objective lens is irradiated onto any track such that the center of the laser spot is coincident with the center line of the track, the reflected laser spot from the track is detected by the photodetector 30 such that the center of the reflected laser spot is coincident with the center point of the photodetector 30.

As shown in FIG. 10, upon incidence of the reflected laser spot, each of the eight photodetecting areas (photodetecting sectors) $D_1$ to $D_8$ converts the incident light to an electrical signal to output a corresponding one of photodetection signals $R_1$ to $R_8$ therefrom. Each of the output photodetection signals $R_1$ to $R_8$ is input to a corresponding one of the information signal calculating units 40 to 49 and the focus error signal calculating unit 50.

At this time, the information signal calculating units 40 to 49 and the focus error signal calculating unit 50 output information signals $S_0$ to $S_9$ and the focus error signal FE as represented by the following equations (4) to (14):

$$S_0 = R_1 + R_2 + R_3 + R_4 + R_5 + R_6 + R_7 + R_8 \tag{4}$$

$$S_1 = R_8 + R_1 - (R_4 + R_5) \tag{5}$$

$$S_2 = R_1 + R_2 - (R_5 + R_6) \tag{6}$$

$$S_3 = R_2 + R_3 - (R_6 + R_7) \tag{7}$$

$$S_4 = R_3 + R_4 - (R_7 + R_8) \tag{8}$$

$$S_5 = R_4 + R_5 - (R_8 + R_1) \tag{9}$$

$$S_6 = R_5 + R_6 - (R_1 + R_2) \tag{10}$$

$$S_7 = R_6 + R_7 - (R_2 + R_3) \tag{11}$$

$$S_8 = R_7 + R_8 - (R_3 + R_4) \tag{12}$$

$$S_9 = R_1 + R_8 = (R_2 + R_3) \tag{13}$$

$$FE = R_1 + R_2 + R_5 + R_6 - (R_3 + R_4 + R_7 + R_8) \tag{14}$$

Next, the reproducing operation of the compact disc 2 of the first embodiment using the compact disc player 100 of the second embodiment will be described. The following operation is based on a calculation result obtained by performing a calculation simulation with the basic equation based on the scalar theory on a read-out signal of an optical disc which is introduced by H. H. Hopkins (reference paper:"Diffraction theory of laser read-out systems for optical video discs" by H. H. Hopkins, Journal of the Optical Society of America, Vol. 69, No. 1, January 1979). The paper of Hopkins as described above introduces the following equation (3,13):

$$I(x,y) = \sum_m \sum_n \sum_{m'} \sum_{n'} \exp\{-i2\pi[((m-m')/p)u + \tag{3.13}$$

$$((n-n')/q)v]\} \times$$

$$R(m,n)R^*(m',n')f(x - m/p, y - n/q)f^*(x - m'/p, y - n'/q)$$

In the equation (3.13), $I(x,y)$ represents an light-intensity distribution on the photodetecting surface of the photodetector. $R(m,n)$ represents the reflection coefficient of a diffracted light at each order, and it is represented by the following equation (6.19) in the Hopkins' paper for an information pit as shown in FIG. 11:

$$R(m,n) = \sin(\pi m)/\pi m \times \sin(\pi n)/\pi n + \tag{6.19}$$

$$[(i/2\pi mq)I_1(n/q;\gamma) + (1/pq)I_2(m/p,n\gamma/q)] \times$$
$$[\exp(-i\pi(m/p)\beta)] + [(-i/2\pi mq)I_1(n/q;\gamma) +$$

$$(1/pq)I_2(-m/p,n/q;\gamma)]\exp[+i\pi(m/p)\beta]$$

Figure 11A:
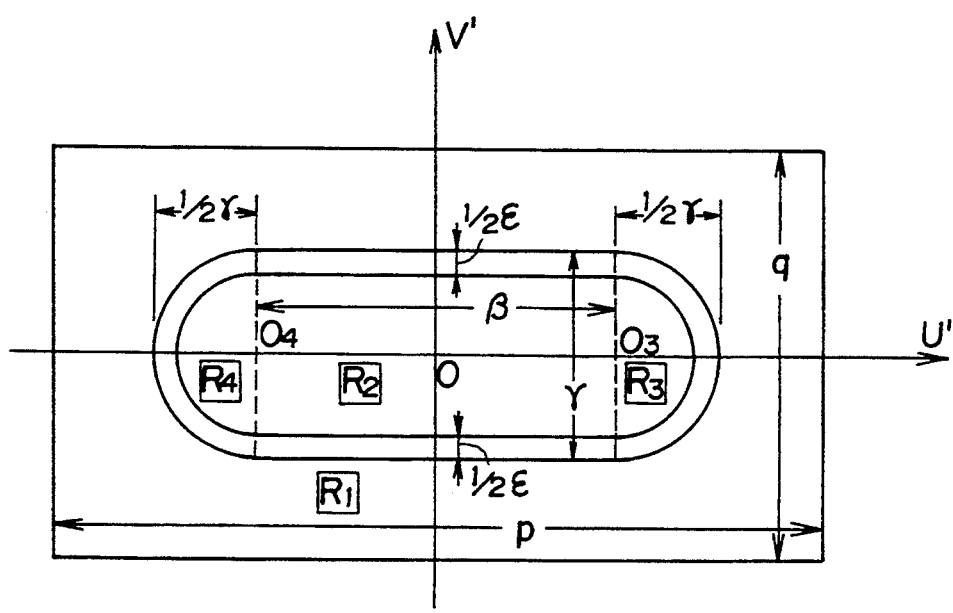
FIGS. 11(A)–11(C) are explanatory diagrams showing a condition for a calculation simulation in this invention.
Figure 11B:
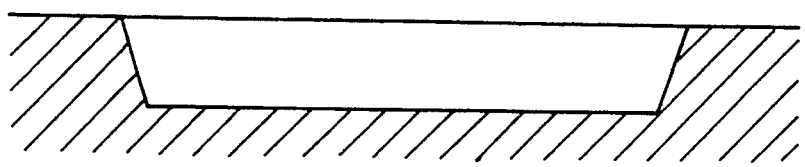
Figure 11C:
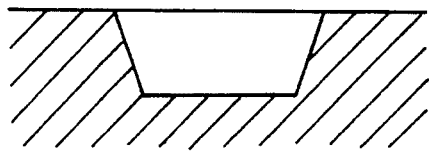
Figure 12:
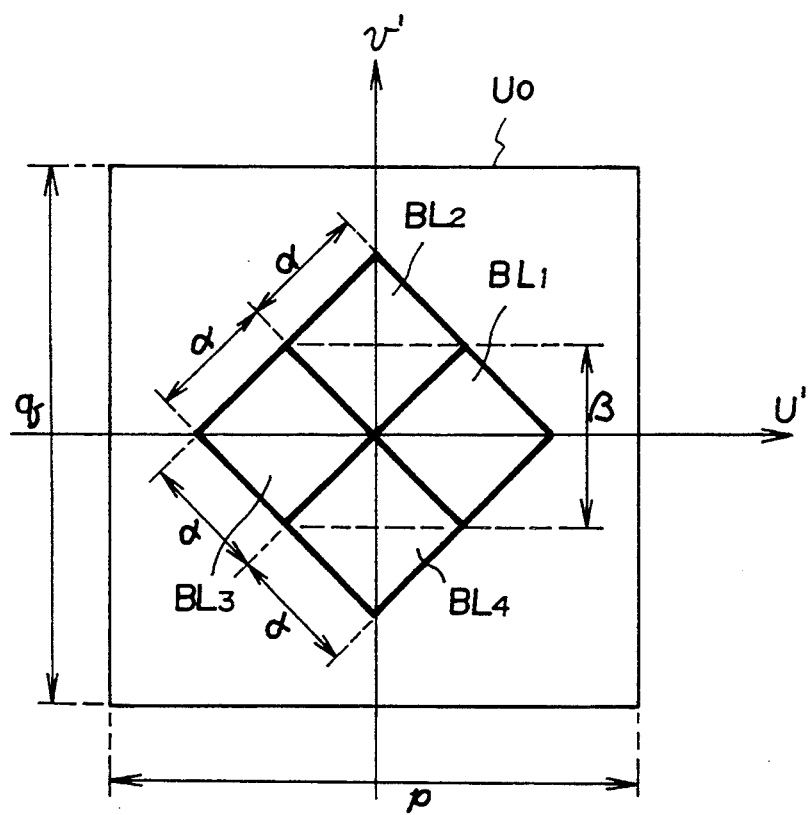
FIG. 12 is another explanatory diagram showing the condition for the calculation simulation in this invention.

The parameters in the equation (6.19) are shown in FIG. 11(A). FIG. 11(B) is a cross-sectional view of the information pit which is viewed from a direction v' in FIG. 11(A), and FIG. 11(C) is a cross-sectional view of the information pit which is viewed from a direction u' in FIG. 11(A). In this calculation simulation, an information pit shape including a combination of four pit fragments $BL_1$ to $BL_4$ as shown in FIG. 12 is adopted, and "Hopkins' basic equation" as described above is applied to this information pit shape. The reflection coefficient $R(m,n)$ of a diffracted light at each order is represented by the following equation for the information pit shape as shown in FIG. 12:

$$R(m,n) = \frac{\sin(\pi m)}{\pi m} \times \frac{\sin(\pi n)}{\pi n} + \frac{2}{pq} \times \tag{15}$$

$$\frac{\sin\{(\pi\beta/2)(m/p + n/q)\}}{\pi(m/p + n/q)} \times \frac{\sin\{(\pi\beta/2)(n/q - m/p)\}}{\pi(n/q - m/p)} \times$$

$$[\exp[-i\pi(m/p)\beta]\{\exp(iH_1) - 1\} +$$

-continued $$\exp[-i\pi(n/q)\beta]\{\exp(iH_2) - 1\} +$$

$$\exp[-i\pi(m/p)\beta]\{\exp(iH_3) - 1\} +$$

$$\exp[-i\pi(n/q)\beta]\{\exp(iH_4) - 1\}]$$

In the equation (15), representing wavelength of laser beam, pit height and refractive index of the disc substrate by $\lambda$, d and n, each of $H_1$ to $H_4$ is set to the following value:

(a) in a case where a pit fragment is located at a pit fragment $BL_1$ position, $$H_1 = 4\pi nd/\lambda \quad (16)$$

(b) in a case where no pit fragment is located at the pit fragment $BL_1$ position, $$H_1 = 0 \quad (17)$$

(c) in a case where a pit fragment is located at a pit fragment $BL_2$ position, $$H_2 = 4\pi nd/\lambda \quad (18)$$

(d) in a case where no pit fragment is located at the pit fragment $BL_2$ position, $$H_2 = 0 \quad (19)$$

(e) in a case where a pit fragment is located at a pit fragment $BL_3$ position, $$H_3 = 4\pi nd/\lambda \quad (20)$$

(f) in a case where no pit fragment is located at the pit fragment $BL_3$ position, $$H_3 = 0 \quad (21)$$

(g) in a case where a pit fragment is located at a pit fragment $BL_4$ position, and $$H_4 = 4\pi nd/\lambda \quad (22)$$

(h) in a case where no pit fragment is located at the pit fragment $BL_4$ position, $$H_4 = 0 \quad (23)$$

Each parameter used in this calculation simulation is as follows.

The pit height h is set to $\lambda/8$ ($\lambda$:wavelength of the laser beam) so that the difference in amplitude between a primary diffraction light and a minus-order diffraction light is maximized. The size of the information pit is set to $\alpha = 0.3$ ($\mu$m) in FIG. 12. Therefore, the maximum size of pit pattern is $0.6 \times 0.6$ ($\mu$m).

Next, the calculation simulation is carried out for two cases where the dimension of an information unit $U_0$ is different, $$\text{case 1: } q = g, \text{ and } P = q = 1/\sqrt{2} \times \lambda/NA \quad (24),$$

$$\text{case 2: } q = g, \text{ and } P = q = \lambda/NA \quad (25).$$

The condition of the optical pick-up is that $\lambda = 0.670$ $\mu$m and $NA = 0.6$.

Therefore, two diffracted lights are overlapped with each other in the case 1 and the three diffracted lights are overlapped with one another in the case 2. A light intensity distribution of the reflection light when the laser light beam is irradiated onto the information pit as shown in FIG. 12 can be obtained by substituting the equation (15) into the equation (3.13).

Figure 14:
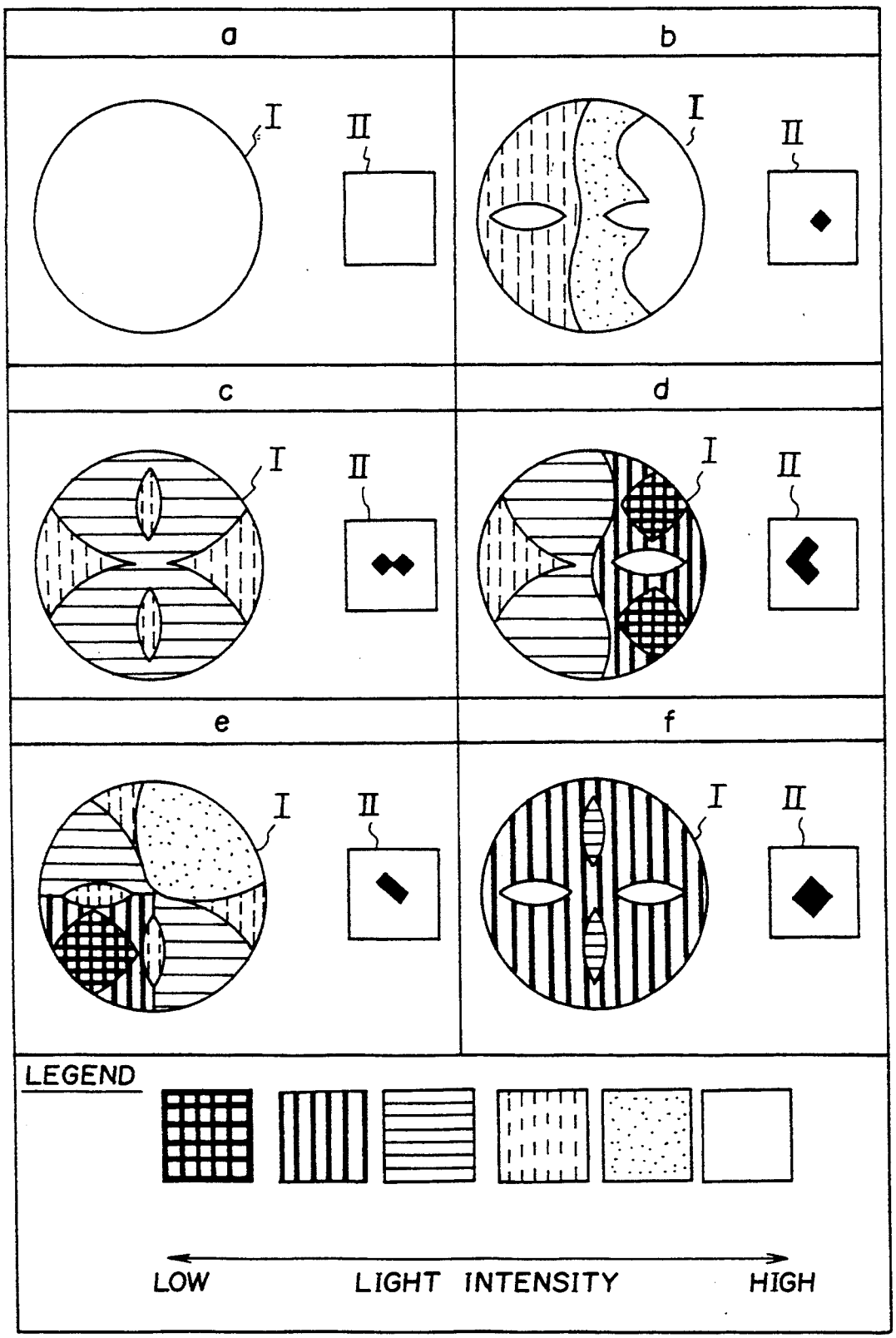
FIG. 14 is another diagram showing a light intensity distribution pattern which represents a calculation result of this invention.

The light intensity distribution on the photodetector in the case 1 is shown in I of FIG. 13, and the light intensity distribution on the photodetector in the case 2 is shown in I of FIG. 14. For example, pattern b shows a light intensity distribution corresponding to a hexadecimal code "4" in the case 1. A light intensity distribution corresponding to a hexadecimal code "2" is obtained by clockwisely rotating the light intensity distribution of pattern b by 90 degree while a light intensity distribution corresponding to a hexadecimal code "8" is obtained by counterclockwisely rotating the light intensity distribution of pattern b by 90 degree. Light intensity distribution patterns corresponding to other hexadecimal codes can be obtained in the same manner.

In FIGS. 13 and 14, the high signal intensity means that the light intensity distribution pattern is light, and the low signal intensity means that the light intensity distribution pattern is dark. As is apparent from the light intensity pattern as shown in FIGS. 13 and 14, in both of the cases 1 and 2, each of the hexadecimal codes has a different light intensity pattern, and thus it could be necessarily specified if the light intensity distribution pattern is detected.

By integrating the light intensity distribution for every photodetecting sectors $D_1$ to $D_8$ of the photodetector 30 as shown in FIG. 10, the values of the photodetection signals $R_1$ to $R_8$ can be calculated using the respective photodetecting sectors $D_1$ to $D_8$.

Next, an example of a method for reading out each of hexadecimal codes "0" to "F" from each of information signals $S_0$ to $S_9$, calculated by the equations (4) to (13) using the photodetection signals $R_1$ to $R_8$, will be described with reference to FIGS. 15 to 19.

Figure 15:
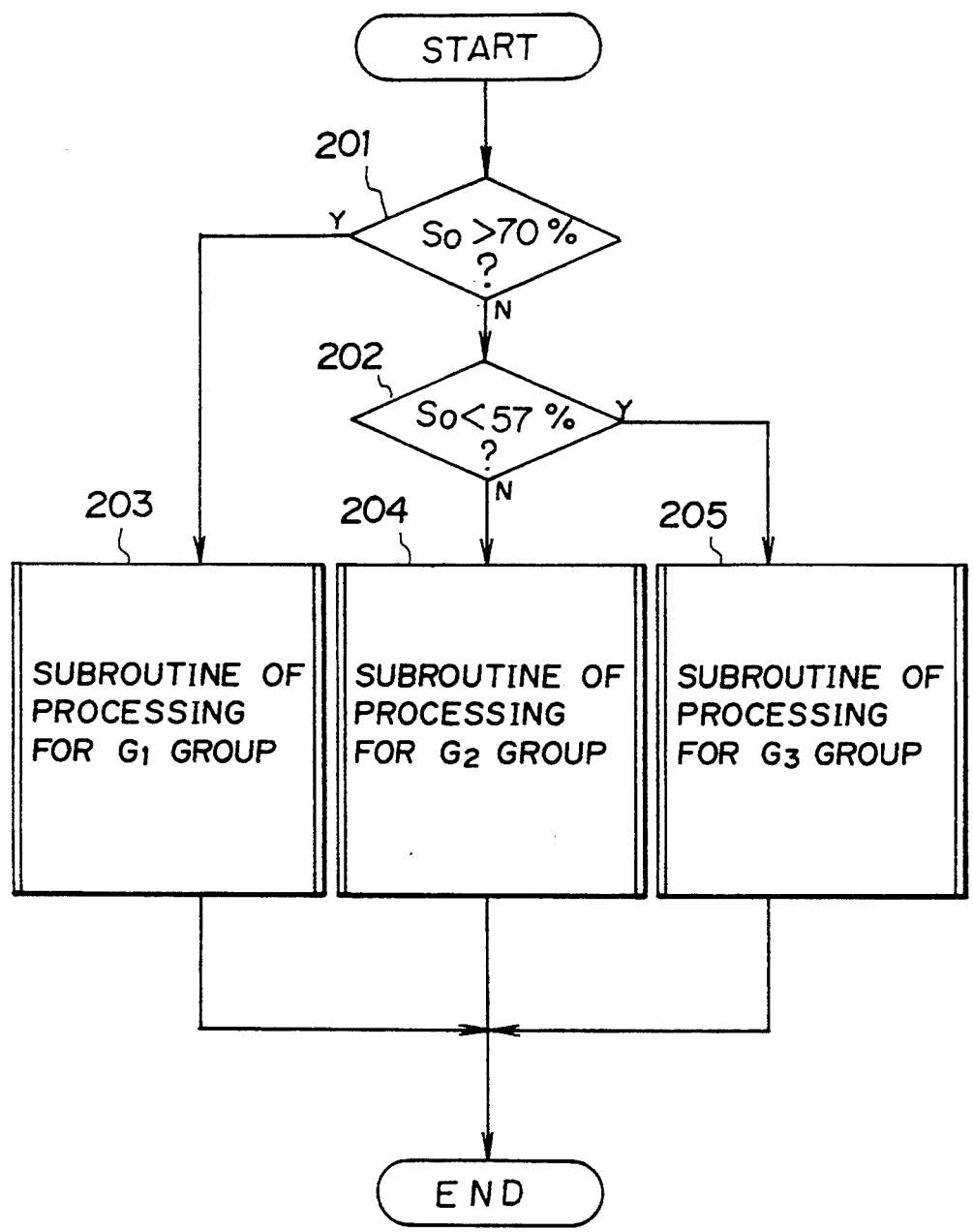
FIG. 15 is a flowchart showing a recorded information read-out method according to this invention.

First, the information signal $S_0$ is classified into three groups G1 to G3 in accordance with its signal intensity. That is, as shown in FIG. 15, assuming the maximum signal intensity to be 100%, the information signal $S_0$ whose signal intensity is larger than 70% of the maximum signal intensity is classified into the group G1 in steps 201 and 203. The information signal $S_0$ whose signal intensity is smaller than 57% of the maximum signal intensity is classified into the group G3 in steps 202 and 205. Further, the information signal $S_0$ whose signal intensity is above 57% and below 70% of the maximum signal intensity is classified into the group G2 in steps 202 and 204. In this case, The information signal $S_0$ having 100% signal intensity means that there is no information pit, and the laser beam is totally reflected from the information recording surface on the optical disc and returned to the photodetector. Here, a case where the information signal $S_0$ belongs to the group G1 means that only one pit fragment exists, a case where the information signal $S_0$ belongs to the group G2 means that two pit fragments exist, and a case where the information signal $S_0$ belongs to the group G3 means that three or more pit fragments exist.

Figure 16:
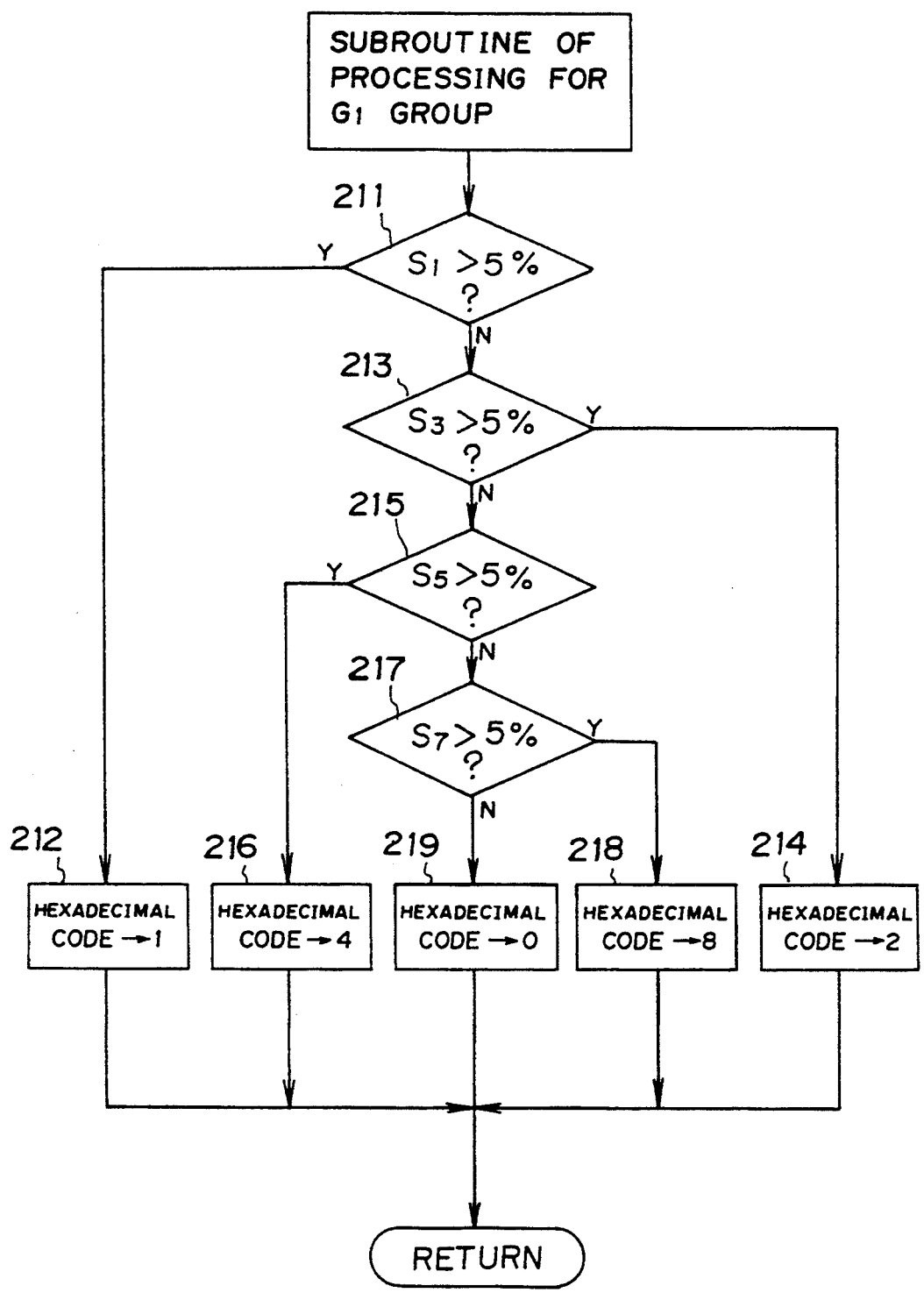
FIG. 16 is another flowchart showing the recorded information read-out method according to this invention.

Next, a method of specifying a hexadecimal code from each information signal within the group G1 will be described with reference to FIG. 16. In this case, the information signals $S_1$, $S_3$, $S_5$ and $S_7$ are used.

First, it is judged whether the value of the signal $S_1$ is larger than 5% or not in step 211. If $S_1 > 5\%$, the information pit is judged to be the hexadecimal code "1" in step 212. Subsequently, for the signals whose $S_1$ value is below 5%, it is judged whether the value of the signal $S_3$ is larger than 5% or not in step 213, and if $S_3 > 5\%$, the information pit is judged to be the hexadecimal code "2" in step 214. Subsequently, for the signals whose $S_3$ value is below 5%, it is judged whether the value of the signal $S_5$ is larger than 5% or not in step 215, and if $S_5 > 5\%$, the information pit is judged to be the hexadecimal code "4" in step 216. Subsequently, for the signals whose $S_5$ value is below 5%, it is judged whether the value of the signal $S_7$ is larger than 5% or not in step 217, and if $S_7 > 5\%$, the information pit is judged to be the hexadecimal code "8" in step 218. If $S_7 \leq 5\%$, the information pit is judged to be the hexadecimal code "0" in step 219.

Figure 17:
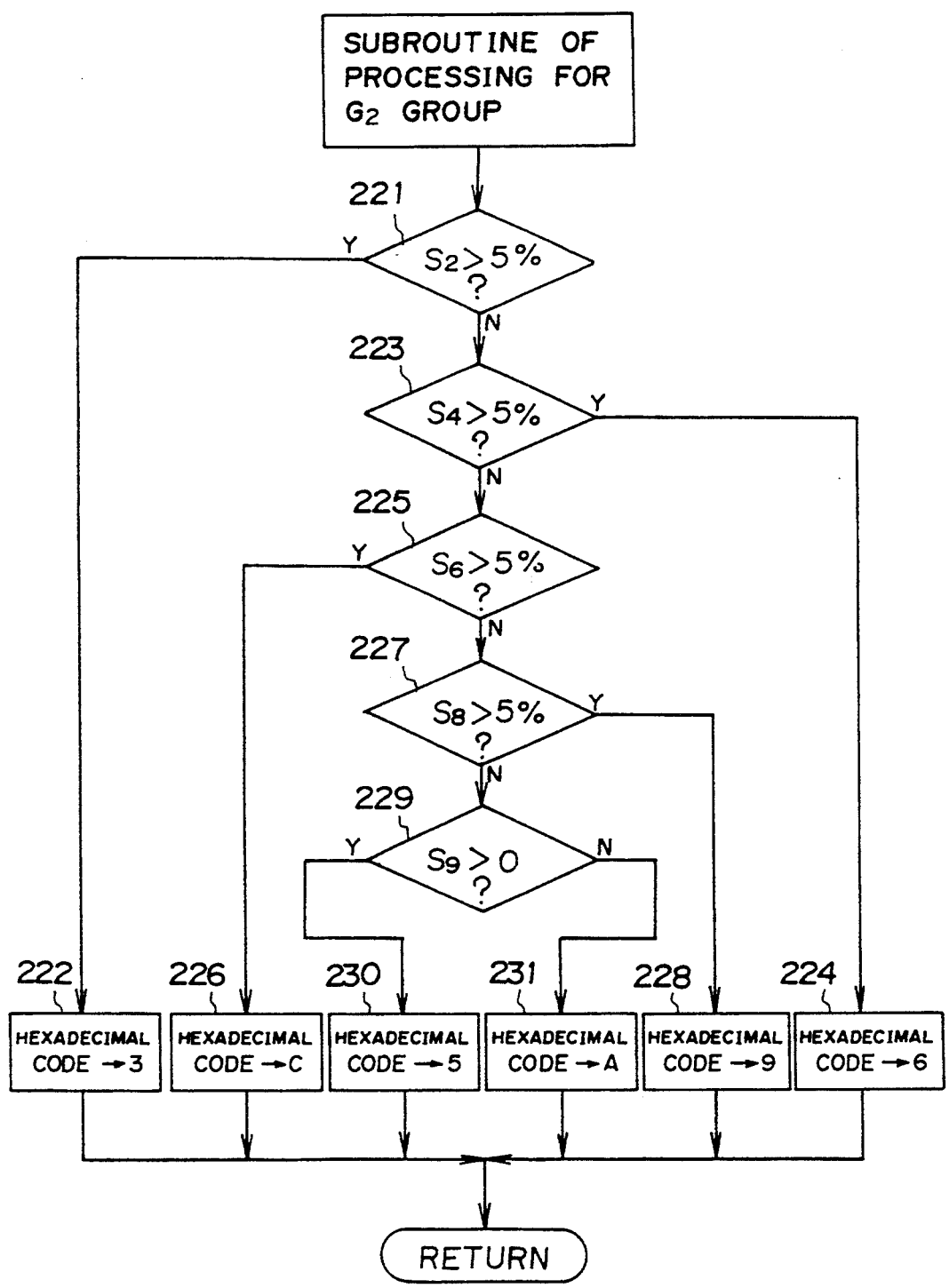
FIG. 17 is still another flowchart showing the recorded information read-out method according to this invention.

Next, a method of specifying a hexadecimal code from each information signal within the group G2 will be described with reference to FIG. 17. In this case, the information signals $S_2$, $S_4$, $S_6$, $S_8$ and $S_9$ are used.

First, it is judged whether the value of the signal $S_2$ is larger than 5% or not in step 221. If $S_2 > 5\%$, the information pit is judged to be the hexadecimal code "3" in step 222. Subsequently, for the signals whose $S_2$ value is below 5%, it is judged whether the value of the signal $S_4$ is larger than 5% or not in step 223, and if $S_4 > 5\%$, the information pit is judged to be the hexadecimal code "6" in step 224. Subsequently, for the signals whose $S_4$ value is below 5%, it is judged whether the value of the signal $S_6$ is larger than 5% or not in step 225, and if $S_6 > 5\%$, the information pit is judged to be the hexadecimal code "C" in step 226. Subsequently, for the signals whose $S_6$ value is below 5%, it is judged whether the value of the signal $S_8$ is larger than 5% or not in step 227, and if $S_8 > 5\%$, the information pit is judged to be the hexadecimal code "9" in step 228. If $S_8 \leq 5\%$, it is judged whether the value of the signal $S_9$ is a positive value or not in step 229, and if $S_9 > 0$, the information pit is judged to be the hexadecimal code "5" in step 230. If $S_9 \leq 0$, the information pit is judged to be the hexadecimal code "A" in step 231.

Figure 18:
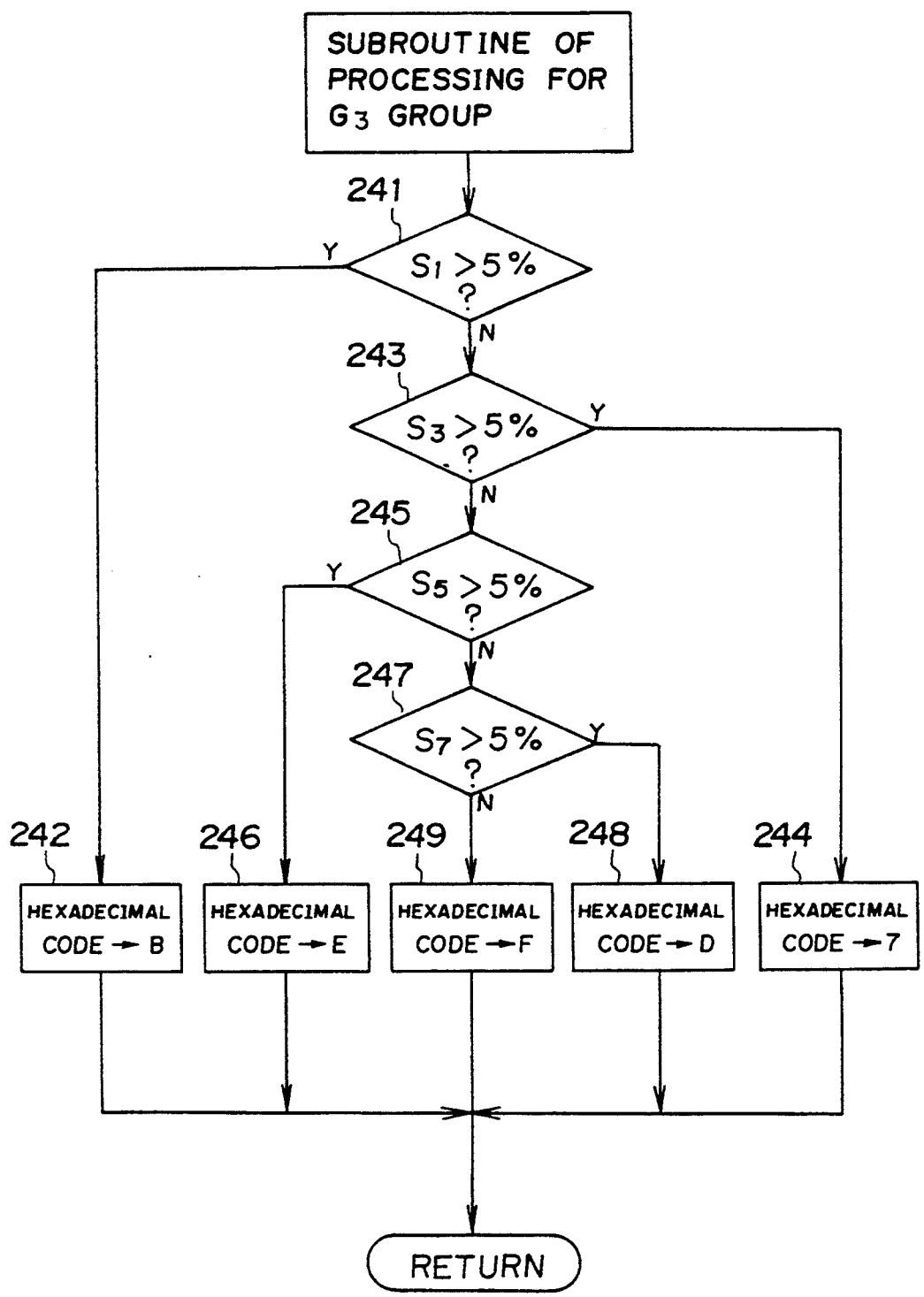
FIG. 18 is still another flowchart showing the recorded information read-out method according to this invention.

Next, a method of specifying a hexadecimal code from each information signal within the group G3 will be described with reference to FIG. 18. In this case, the information signals $S_1$, $S_3$, $S_5$, and $S_7$ are used.

First, it is judged whether the value of the signal $S_1$ is larger than 5% or not in step 241. If $S_1 > 5\%$, the information pit is judged to be the hexadecimal code "B" in step 242. Subsequently, for the signals whose $S_1$ value is below 5%, it is judged whether the value of the signal $S_3$ is larger than 5% or not in step 243, and if $S_3 > 5\%$, the information pit is judged to be the hexadecimal code "7" in step 244. Subsequently, for the signals whose $S_3$ value is below 5%, it is judged whether the value of the signal $S_5$ is larger than 5% or not in step 245, and if $S_5 > 5\%$, the information pit is judged to be the hexadecimal code "E" in step 246. Subsequently, for the signals whose $S_5$ value is below 5%, it is judged whether the value of the signal $S_7$ is larger than 5% or not in step 247, and if $S_7 > 5\%$, the information pit is judged to be the hexadecimal code "D" in step 248. If $S_7 \leq 5\%$, the information pit is judged to be the hexadecimal code "F" in step 249.

Figures 19A, 19B:
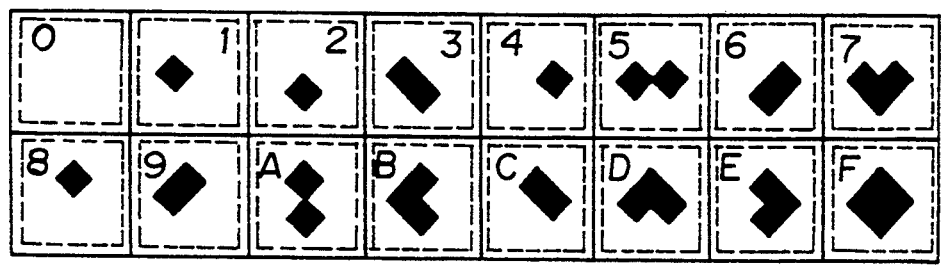
FIGS. 19(A)–19(B) is still another diagram showing a calculation simulation result according to this invention.

FIG. 19 shows the calculation simulation result for the case 1 in the information read-out method. In FIG. 19(B), a value as represented by a bold figure means that each hexadecimal code is judged by the value.

The signal read-out method as described above is an typical example, and thus other calculation methods or pattern recognition methods may be used to specify the hexadecimal codes. As shown in FIGS. 13 and 14, light intensity distribution patterns of the respective hexadecimal codes are wholly different from one another, so that each of the hexadecimal codes can be necessarily specified by recognizing only the light intensity distribution pattern.

Third Embodiment

Figure 20:
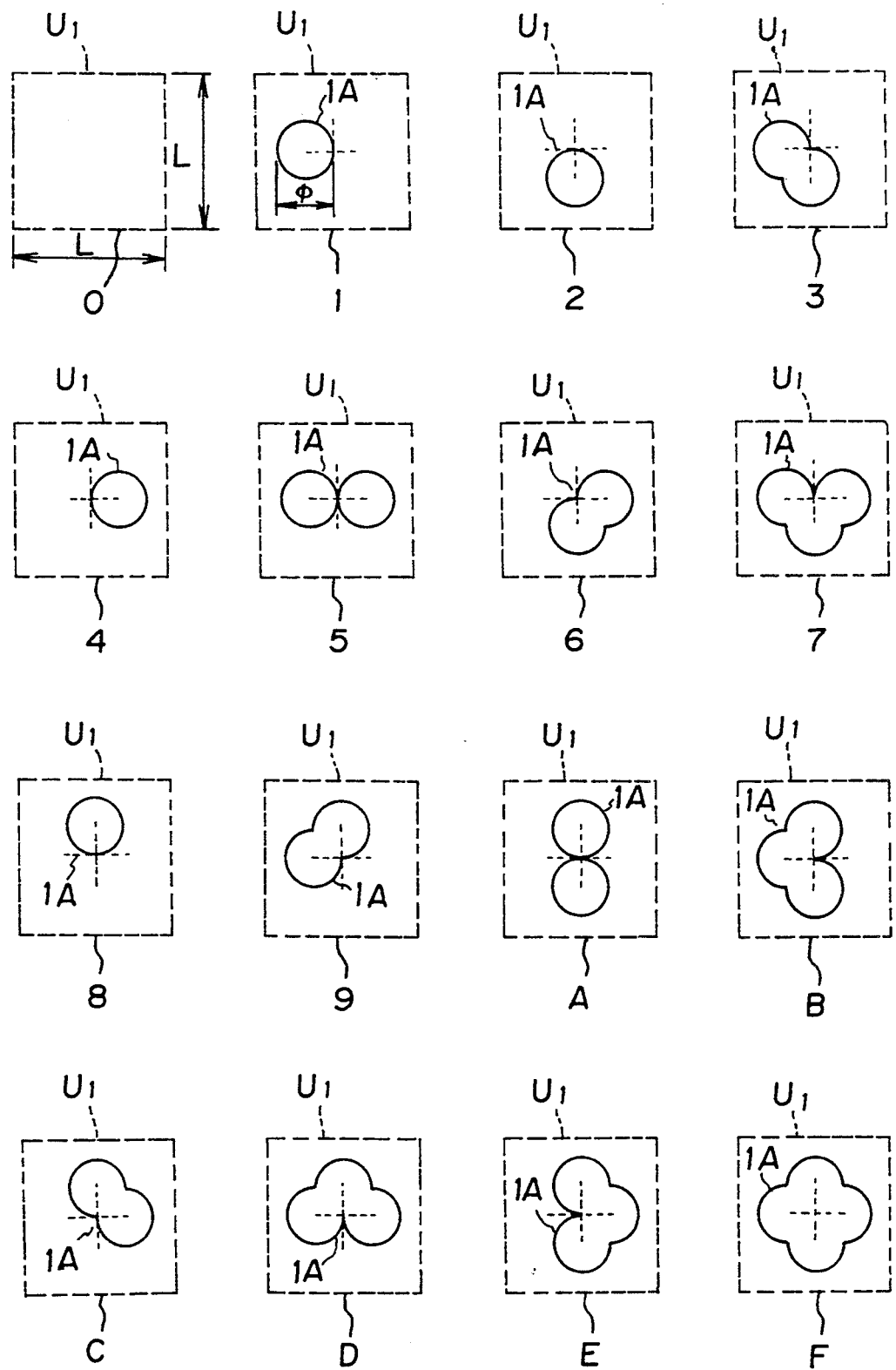
FIG. 20 is a diagram showing a bit pattern in a third embodiment according to this invention.

FIG. 20 shows various pit pattern constructions according to third embodiment in which this invention is applied to a compact disc. In this embodiment, the same conditions as the first embodiment are adopted except for the construction of the pit pattern. As shown in FIG. 20, the pit fragment constituting the information pit of this invention may be designed not only in a rhombic form, but also in a circular form. This is proved by the calculation simulation. In this embodiment, the diameter of a circular pit fragment is set to $\phi = 0.335$ ($\mu$m) and the unit length of an information unit $U_1$ is set to $L_1 = 0.79$ ($\mu$m).

Figure 21A:
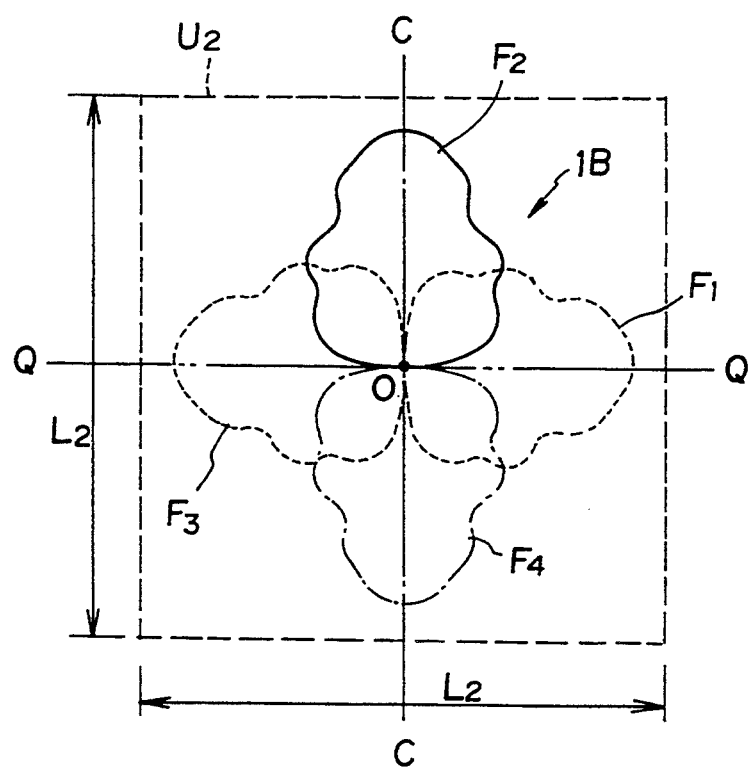
FIGS. 21(A) and 21(B) are explanatory diagrams showing the principle of an information pit according to the third embodiment of this invention.
Figure 21B:
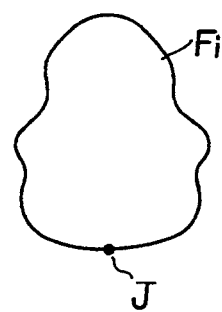

That is, generally, as shown in FIG. 21(A), each of pit fragments $F_1$ to $F_4$ may be designed so as to be symmetrical with respect to its symmetrical axis which is any one of a line C—C in the disc peripheral direction and a line Q—Q in the disc radial direction, and so as to have the substantially same shape as another pit fragment. In addition, as shown in FIG. 21(B), it is sufficient that a point J on the figure of each pit fragment $F_1$ is coincident with (or located at) the center point of an information unit $U_2$, that is, an unit center O.

Other points to be considered when the recording and reproducing operation of the information is carried out for the optical disc using the information pit of this invention will be described.

First, in the tracking servo control of the optical pick-up, assuming v'-axis of FIG. 12 to be the disc peripheral direction, unless the total number of pit fragments in each of two areas at both sides of the v'-axis within a predetermined track length is substantially equal to each other, there is possibility of erroneous tracking servo control even when the laser beam is irradiated onto the center line of the track. Therefore, in order to stabilize the tracking servo control, the total number of pit fragments which are located particularly at positions of the $BL_1$ and $BL_3$ in FIG. 12 is required to be substantially equal to each other. In addition, the total number of pit fragments ($BL_1 + BL_2 + BL_3 + BL_4$) is also fixed to a constant value every predetermined track length.

In principle, in order to recognize a pit pattern, the amount of "deviation" of the tracking and the time axis is inhibited from exceeding a half of the diameter of the pit fragment (2a in FIG. 7 or $\phi$ in FIG. 20). In a signal read-out method of CD system, the time-axis direction contributes to a jitter, and the tracking direction contributes to the jitter less effectively than the time-axis direction. However, in a pattern recognition method like the system of this invention, the positioning operation having the same accuracy is required for both of the time-axis direction and the tracking direction. A sample servo system or the like may be considered to perform servo of the time-axis direction.

By constructing the information pit in the manner as described above, information of 4 bits (16 kinds) can be recorded every information unit, and the recording density RD when this information pit is applied to the optical disc is represented as follows:

$$RD = \frac{4}{[\lambda/\sqrt{2}\ NA] \times [\lambda/\sqrt{2}\ NA]} \quad (26)$$

Therefore, under the optical pick-up condition of a currently-used CD ($\lambda=0.780\ \mu m$, NA=0.45), $$RD=2.7\times 10^6\ (bits/mm^2),$$

under the optical pick-up condition of a currently-used laser video disc (LVD) ($\lambda=0.780\ \mu m$, NA=0.50), $$RD=3.3\times 10^6\ (bits/mm^2),$$

and under the optical pick-up condition having shorter wavelength and higher NA ($\lambda=0.670\ \mu m$, NA=0.6) than the currently-used optical pick-up condition, $$RD=6.4\times 10^6\ (bits/mm^2)$$

That is, the recording density which is six to seven times of the presently-used CD at maximum can be obtained.

Figure 22:
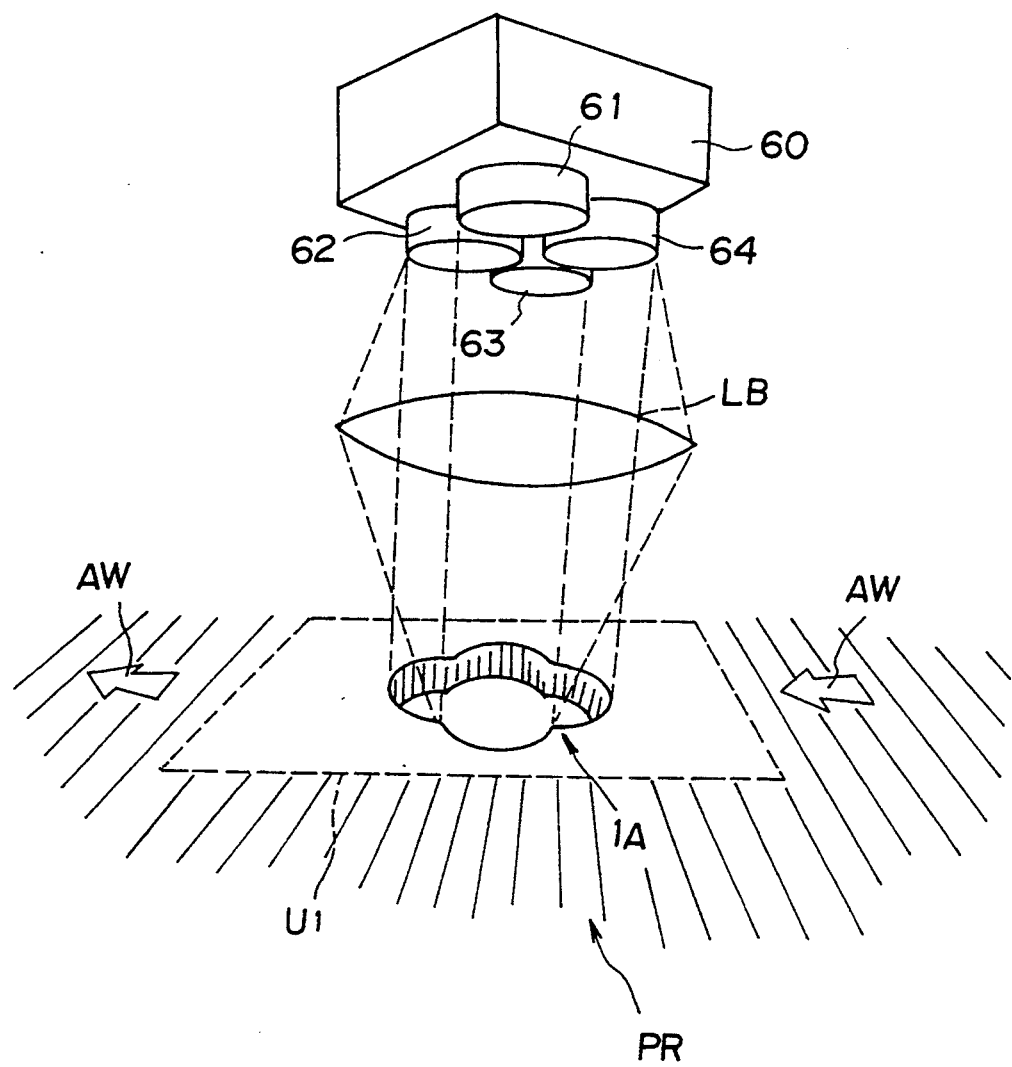
FIG. 22 shows an example of a mastering method for an optical disc according to this invention.

As a mastering method (a method of producing a master disc) for producing a disc on which information pits each having the pit shape of this invention are formed may be considered a method as shown in FIG. 22, in which a glass master coated with a photoresist film PR is irradiated with a laser beam LB movable in the direction as indicated by an arrow AW by an optical head 60 having four semiconductor lasers 61 to 64, and the depth of a photosensed portion 1A on the master is adjusted in accordance with the variation of intensity of the laser output to form an information pit 1A having four pit fragments. In this case, the pit signal read-out operation can be performed even when the four pit fragments do not have the completely same shape.

The dimensional relationship between the unit length, the pit width and the pit length for the information pit 1A is similar to those of the third embodiment, and the same recording density as the third embodiment can be obtained in this embodiment.

This invention is not limited to the above embodiments, and any laser beam wavelength, any numerical aperture, any substrate refractive index, and any information pit dimension and shape may be adopted insofar as the equation (15) is satisfied.

In addition, in the above embodiments, the compact disc is used as the optical disc. However, any type of optical disc may be used insofar as this optical disc is a pit-type, and for example, an LVD or the like may be used.

Further, the information pit may be designed so as to be projective or recessed with respect to the incident laser beam.

As described above, according to this invention, under each of the conditions of the current laser beam wavelength and the current lens numerical aperture, the track pitch can be further reduced in comparison with the current value. In addition, when the laser beam diameter w will be further reduced by changing the wavelength $\lambda$ and the numerical aperture NA in the future, the track pitch can be further reduced in proportion to the reduction of the laser beam diameter w.

Therefore, this invention has an advantage that the recording density can be further improved.

What is claimed is:

1. An optical disc having an information recording surface on which information is recorded, said information being read out and reproduced by irradiating a laser light having a predetermined wavelength under the condition of a predetermined numerical aperture and receiving a diffracted and reflected laser light, said disc comprising:

a track spirally formed on said information recording surface and extending in a disc peripheral direction defined as a direction along the periphery of said optical disc, said track having a predetermined track pitch between neighboring tracks;

a plurality of information units formed on said track, each of said information units having a predetermined unit length in both of the disc peripheral direction and a disc radial direction defined as a direction perpendicular to the disc peripheral direction, said information being recorded in the form of an information pit in each of said information units, said information pit having a plurality of pit patterns each of which is formed as combination of a plurality of pit fragments having substantially same shape, each of said pit fragments having a predetermined optical pit height and a plane figure which is symmetrical with respect to one of a first line or a second line, said first line passing through center points of each of said information units and extending in the disc peripheral direction, said second line passing through the center point and extending in the disc radial direction, and a common point in the plane figures of said pit fragments being located at the position substantially coincident with the center point of the information unit.

2. An optical disc according to claim 1, wherein said information pit comprises one of sixteen pit patterns and each of said pit patterns are formed as a combination of a multiple of four pit fragments.

3. An optical disc reproducing apparatus for reproducing information from the optical disc according to claim 1, comprising:

light irradiation means for irradiating a laser light having a predetermined wavelength onto said information recording surface of said optical disc under the condition of a predetermined numerical aperture;

photodetecting means having a detecting surface divided into a plurality of photodetecting sectors for converting laser light incident to each of said photodetecting sectors to electrical signals and outputting the electrical signals as a photodetection signals, one of separating lines of said photodetecting sectors being parallel to the disc peripheral direction;

an optical system having an optical path through which a returned laser light diffracted and reflected from the information pit is incident to the center portion of said photodetecting means when the laser light is irradiated onto the center line of the track;

calculating means for calculating and outputting calculation signals indicating presence of said pit fragments on the basis of the photodetection signals from each of said photodetecting sectors; and information reproducing means for reproducing said recorded information by specifying one of the plurality of said pit patterns in accordance with each of said calculation signals.

4. An optical disc reproducing apparatus according to claim 3, wherein said information pit comprises one of sixteen pit patterns, and each of said pit patterns are formed as a combination of a multiple of four pit fragments.

5. An optical disc reproducing apparatus according to claim 4, wherein said detecting surface of said photodetecting means is divided into eight photodetecting sectors.

6. A method for recording information onto an optical disc having an information recording surface to be recorded with information which is read out and reproduced by irradiating a laser light having a predetermined wavelength under the condition of a predetermined numerical aperture and receiving a diffracted and reflected laser light, said method comprising the steps of:

providing a plurality of information units on the information recording surface in a spiral track manner so as to extend in a disc peripheral direction defined as a direction along the periphery of said optical disc and have a predetermined track pitch between two neighboring tracks, each of said information units having predetermined unit lengths in both of the disc peripheral direction and a disc radial direction defined as a direction perpendicular to the disc peripheral direction, assigning information to be recorded to one of a plurality of pit patterns, each of said pit patterns being formed as a combination of a plurality of pit fragments having substantially same shape, each of said pit fragment having a predetermined optical pit height and a plane figure which is symmetrical with respect to one of a first line and a second line, said first line passing through a center point of said information unit and extending in the disc peripheral direction, said second line passing through the center point of the information unit and extending in the disc radial direction, recording information in each of said plurality of information units by forming information pits having said pit patterns in such a manner that a common point of the plane figures of said pit fragments is located at the position substantially coincident with the center point of the information unit.

7. A method according to claim 6, wherein said information pits comprises sixteen pit patterns, and each of said pit patterns are formed as a combination of a multiple of four pit fragments.

8. A method for reproducing information from the optical disc according to claim 6, comprising the steps of:

irradiating a laser light having predetermined wavelength onto said information recording surface of said optical disc under the condition of the predetermined numerical aperture;

receiving a returned laser light diffracted and reflected from the information pit by photodetecting means having a detecting surface divided into a plurality of photodetecting sectors, one of separating lines for said photodetecting surface being parallel to the disc peripheral direction, converting said returned laser light incident to each of said photodetecting sectors to electrical signals and outputting the electrical signals as a photodetection signal;

calculating and outputting calculation signals indicating presence of said pit fragments on the basis of the photodetection signals; and specifying one of the plurality of pit patterns in accordance with each of the calculation signals and reproducing the recorded information.

9. A method according to claim 8, wherein said information pits comprises sixteen pit patterns, and each of said pit patterns are formed as combination of four pit fragments.

10. A method according to claim 9, wherein said detecting surface of said photodetecting means is divided into eight photodetecting sectors.

* * * * *